United States Patent
Moroo

(10) Patent No.: US 10,613,602 B2
(45) Date of Patent: Apr. 7, 2020

(54) INFORMATION PROCESSING APPARATUS, POWER SAVING TRANSITION PROGRAM, AND POWER SAVING TRANSITION METHOD

(71) Applicant: FUJITSU LIMITED, Kawasaki-shi, Kanagawa (JP)

(72) Inventor: Jun Moroo, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/186,634

(22) Filed: Nov. 12, 2018

(65) Prior Publication Data

US 2019/0171261 A1    Jun. 6, 2019

(30) Foreign Application Priority Data

Dec. 6, 2017    (JP) ................................ 2017-234067

(51) Int. Cl.
*G06F 1/20*    (2006.01)
*G06F 1/3296*    (2019.01)
*G05B 15/02*    (2006.01)

(52) U.S. Cl.
CPC ............. *G06F 1/206* (2013.01); *G05B 15/02* (2013.01); *G06F 1/3296* (2013.01)

(58) Field of Classification Search
None
See application file for complete search history.

(56) References Cited

U.S. PATENT DOCUMENTS

| | | | |
|---|---|---|---|
| 2002/0075644 A1* | 6/2002 | Nakagawa | G06F 1/1601 361/679.47 |
| 2013/0264045 A1* | 10/2013 | Chainer | H05K 7/20836 165/287 |
| 2015/0355941 A1 | 12/2015 | Kubota | |
| 2015/0378404 A1 | 12/2015 | Ogawa et al. | |
| 2017/0242728 A1 | 8/2017 | Moroo | |

FOREIGN PATENT DOCUMENTS

| | | |
|---|---|---|
| JP | 2015-230658 | 12/2015 |
| JP | 2017-151656 | 8/2017 |
| WO | 2014147691 | 9/2014 |

* cited by examiner

*Primary Examiner* — Paul B Yanchus, III
(74) *Attorney, Agent, or Firm* — Fujitsu Patent Center

(57) ABSTRACT

An information processing apparatus comprising a plurality of computation nodes each having a CPU, a cooler that cools a refrigerant in a conduit in which the refrigerant that cools the CPU of each of the plurality of computation nodes circulates, and a control node, wherein the control node decreases a cooling power of the cooler after execution of a job by the plurality of computation nodes is ended, and causes the CPU in which the execution of the job is ended to transition from a non-power saving mode to a power saving mode at a predetermined time interval a predetermined number of the CPUs at a time when a temperature of the refrigerant is equal to or more than a threshold value, and stops a process of causing the CPU to transition to the power saving mode when the temperature of the refrigerant is less than the threshold value.

8 Claims, 20 Drawing Sheets

FIG.7A

NODE MANAGEMENT TABLE 101d3

| NODE ID | STATE |
|---|---|
| 102 | NON-POWER SAVING MODE (JOB NON-EXECUTION) |
| 103 | NON-POWER SAVING MODE (JOB NON-EXECUTION) |
| 104 | NON-POWER SAVING MODE (JOB NON-EXECUTION) |
| 105 | NON-POWER SAVING MODE (JOB NON-EXECUTION) |
| 106 | NON-POWER SAVING MODE (JOB NON-EXECUTION) |
| 107 | NON-POWER SAVING MODE (JOB NON-EXECUTION) |
| 108 | NON-POWER SAVING MODE (JOB NON-EXECUTION) |
| 109 | NON-POWER SAVING MODE (JOB NON-EXECUTION) |
| 110 | NON-POWER SAVING MODE (JOB NON-EXECUTION) |

FIG.7B

NODE MANAGEMENT TABLE 101d3

| NODE ID | STATE |
|---|---|
| 102 | POWER SAVING MODE (JOB NON-EXECUTION) |
| 103 | NON-POWER SAVING MODE (JOB NON-EXECUTION) |
| 104 | NON-POWER SAVING MODE (JOB NON-EXECUTION) |
| 105 | NON-POWER SAVING MODE (JOB NON-EXECUTION) |
| 106 | NON-POWER SAVING MODE (JOB NON-EXECUTION) |
| 107 | NON-POWER SAVING MODE (JOB NON-EXECUTION) |
| 108 | NON-POWER SAVING MODE (JOB NON-EXECUTION) |
| 109 | NON-POWER SAVING MODE (JOB NON-EXECUTION) |
| 110 | NON-POWER SAVING MODE (JOB NON-EXECUTION) |

FIG.9

| | STATE | POWER CONSUMPTION | SPECIFIC EXAMPLE |
|---|---|---|---|
| JOB EXECUTION | NON-POWER SAVING MODE | 140 - 200W | CLOCK 3GHz |
| | NON-POWER SAVING MODE | 70 - 80W | CLOCK 3GHz |
| JOB NON-EXECUTION | POWER SAVING MODE | 20W | •REDUCE CLOCK (1.2GHz)<br>•SUSPEND MODE<br>•LIMIT BANDWIDTH WHEN PROCESSOR ACCESSES MEMORY<br>•DO NOT USE SIMD COMMAND |

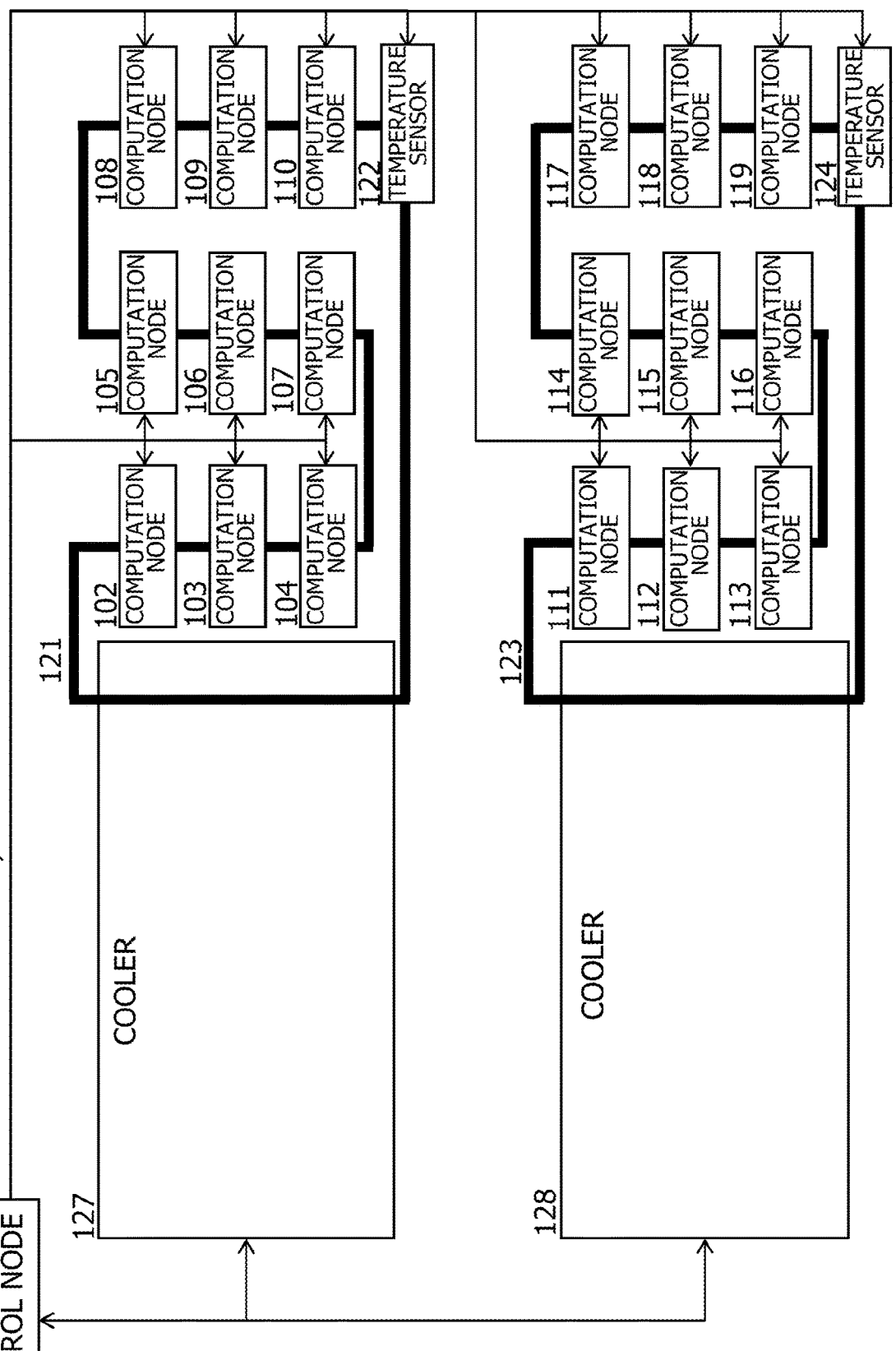

FIG.13

NODE MANAGEMENT TABLE 101d3

| NODE ID | STATE | COOLER ID |
|---|---|---|
| 102 | NON-POWER SAVING MODE (JOB NON-EXECUTION) | 127 |
| 103 | NON-POWER SAVING MODE (JOB NON-EXECUTION) | 127 |
| 104 | NON-POWER SAVING MODE (JOB NON-EXECUTION) | 127 |
| 105 | NON-POWER SAVING MODE (SECOND JOB EXECUTION) | 127 |
| 106 | NON-POWER SAVING MODE (SECOND JOB EXECUTION) | 127 |
| 107 | NON-POWER SAVING MODE (SECOND JOB EXECUTION) | 127 |
| 108 | NON-POWER SAVING MODE (SECOND JOB EXECUTION) | 127 |
| 109 | NON-POWER SAVING MODE (SECOND JOB EXECUTION) | 127 |
| 110 | NON-POWER SAVING MODE (SECOND JOB EXECUTION) | 127 |
| 111 | NON-POWER SAVING MODE (SECOND JOB EXECUTION) | 128 |
| .. | .. | .. |

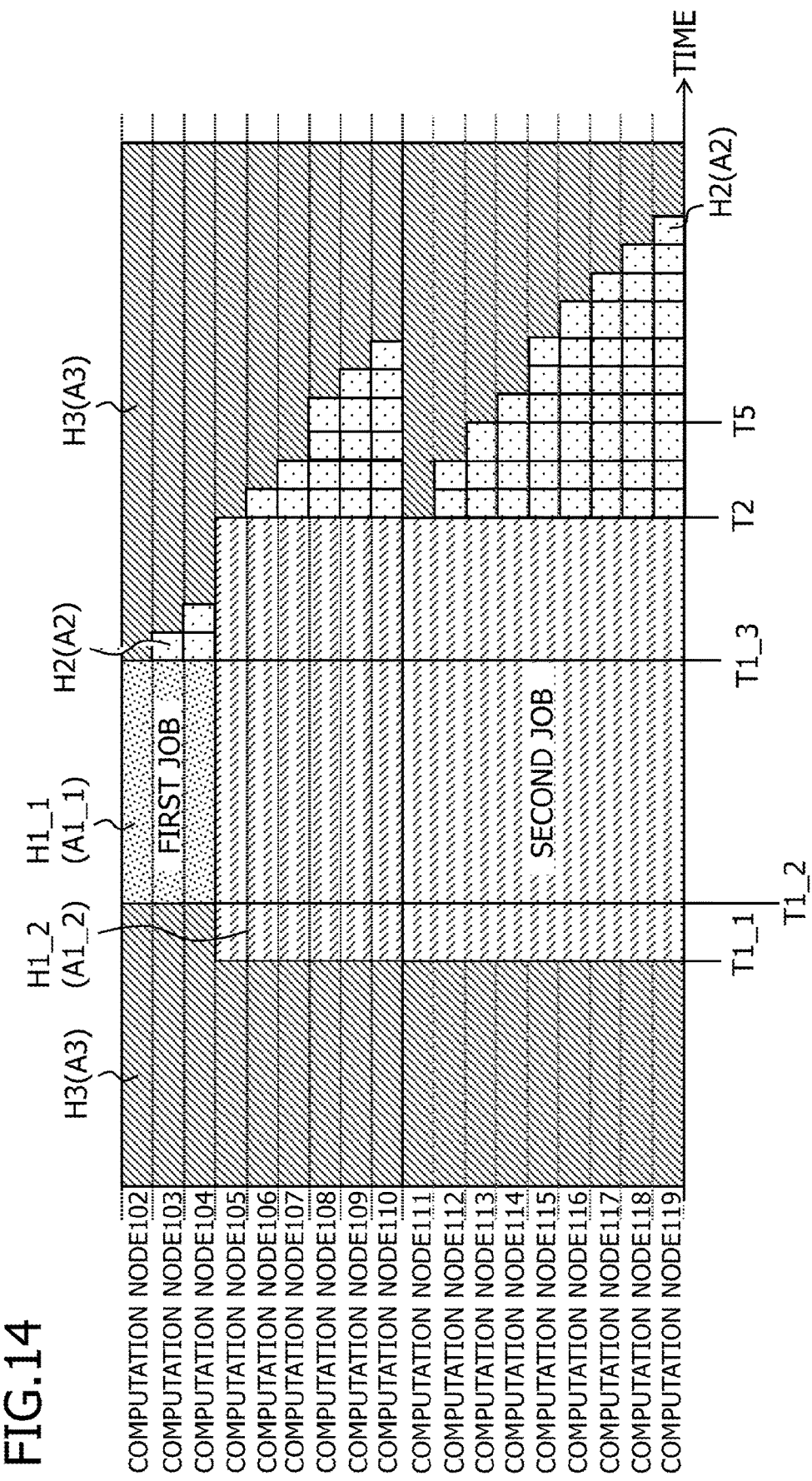

INFORMATION PROCESSING APPARATUS, POWER SAVING TRANSITION PROGRAM, AND POWER SAVING TRANSITION METHOD

CROSS-REFERENCE TO RELATED APPLICATION

This application is based upon and claims the benefit of priority of the prior Japanese Patent Application No. 2017-234067, filed on Dec. 6, 2017, the entire contents of which are incorporated herein by reference.

FIELD

The present invention relates to an information processing apparatus, a power saving transition program, and a power saving transition method.

BACKGROUND

In a conventional information processing apparatus having a plurality of computation nodes that generate heat as a result of execution of processes, a liquid-cooling cooler for cooling the CPU of each of the plurality of computation nodes is used to prevent the failure of the CPU caused by the heat generation.

In such an information processing apparatus having the plurality of computation nodes and the liquid-cooling cooler, from the viewpoint of power savings, it is desirable to cause a plurality of the computation nodes (CPUs) that are not executing the processes to transition from a non-power saving mode to a power saving mode having lower power consumption (amount of heat generation) to bring the computation nodes into a power saving state.

Japanese Laid-open Patent Publication No. 2015-230658 and International Publication Pamphlet No. WO2014/147691 relate to cooling of the CPU.

SUMMARY

However, the time constant of the computation node (CPU) is relatively short and a decrease in the amount of heat generation of the computation node (CPU) progresses rapidly, while the time constant of the liquid-cooling cooler is relatively long and a decrease in the cooling power of the cooler progresses gradually.

Accordingly, for example, when cooling power decrease control of the cooler is executed at the timing when execution of an assigned job is ended, and a plurality of the computation nodes (CPUs) in which the execution of the assigned job is ended are caused to transition from the non-power saving mode to the power saving mode simultaneously, the amount of heat generation of the computation nodes (CPUs) falls below the cooling power of the cooler until the decrease in cooling power catches up with the sharp decrease in the amount of heat generation. That is, the cooling power of the cooler becomes excessive and redundant.

As a result, a refrigerant (e.g., cooling water) circulating in a conduit constituting the cooler is excessively cooled by the redundant cooling power, and the temperature of the refrigerant decreases rapidly. This presents a problem where the refrigerant may be frozen and expanded, the conduit may be damaged, the refrigerant may leak from the damaged part, and peripheral electronic equipment may fail.

According to an aspect of the embodiments, an information processing apparatus comprising:
a plurality of computation nodes each having a CPU that executes an assigned job;
a cooler that cools a refrigerant in a conduit in which the refrigerant that cools the CPU of each of the plurality of computation nodes circulates; and
a control node to which the plurality of computation nodes and the cooler are connected, wherein the control node:
assigns a job to the plurality of computation nodes;
decreases a cooling power of the cooler by a predetermined extent after execution of the job by the plurality of computation nodes to which the job is assigned is ended; and
causes the CPU of each of the plurality of computation nodes in which the execution of the job is ended to transition from a non-power saving mode to a power saving mode at a predetermined time interval a predetermined number of the CPUs at a time when a temperature of the refrigerant is equal to or more than a threshold value, and stops a process of causing the CPU to transition to the power saving mode when the temperature of the refrigerant is less than the threshold value.

According to the present embodiment, it is possible to cause each of the plurality of computation nodes (CPUs) to transition from the non-power saving mode to the power saving mode while preventing the refrigerant circulating in the conduit constituting the liquid-cooling cooler from being excessively cooled.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 7A and 7B illustrate examples of the node management table 101$d$3.

FIG. 9 is a view for illustrating the state of the processor 1 of each of the computation nodes.

FIG. 12 is a view illustrating the schematic configuration of an information processing apparatus 10A to which an information processing apparatus, a power saving transition program, and a power saving transition method of a second embodiment are applied.

FIG. 13 illustrates an example of the node management table 101d3 used in the second embodiment.

FIG. 14 illustrates an example of the change of the state of each of the processors 1 of the computation nodes 102 to 109 correspondingly to the time axis.

DESCRIPTION OF EMBODIMENTS

Summary of First Embodiment

Figure 1:
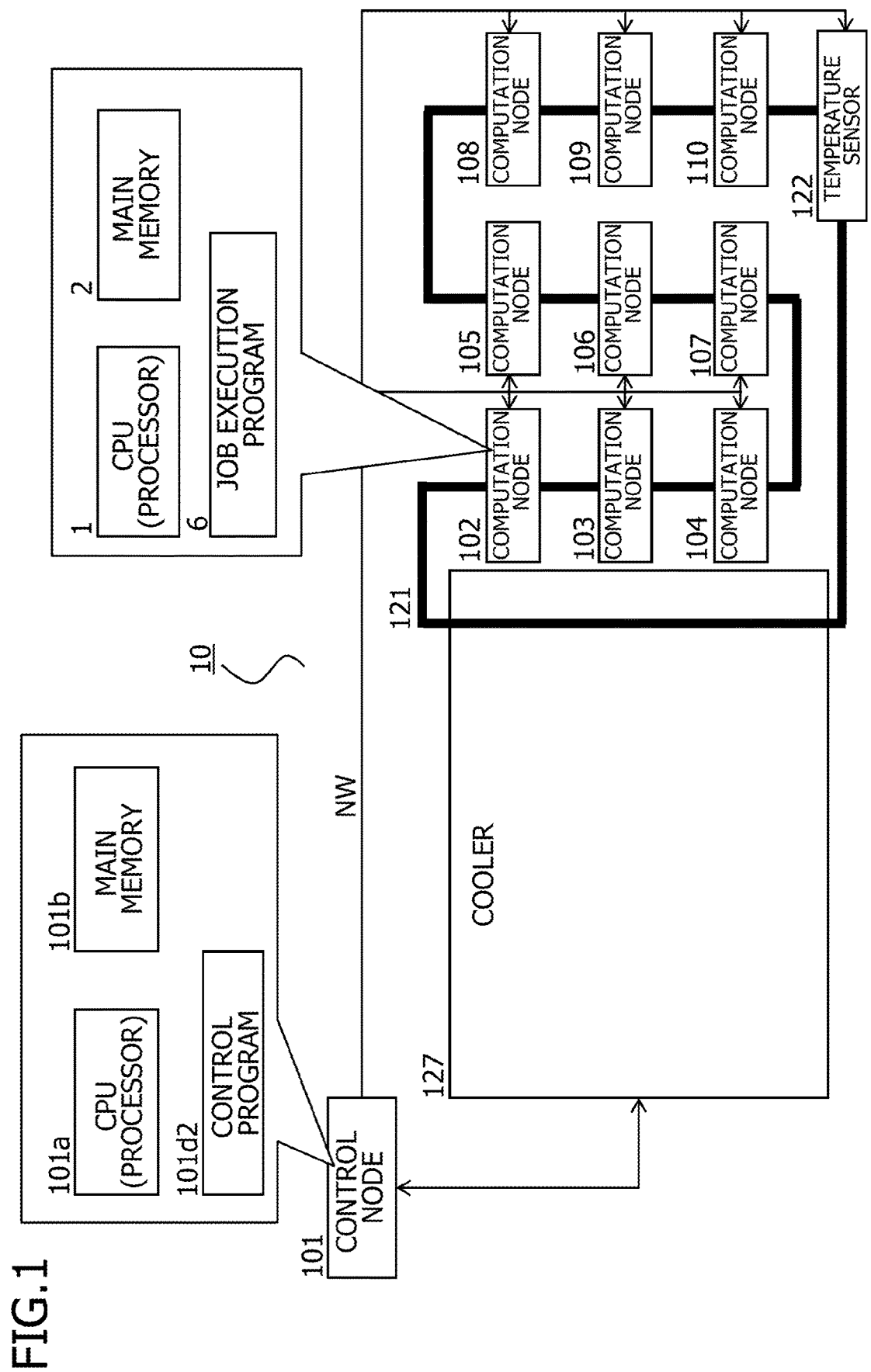
FIG. 1 is a view illustrating the schematic configuration of an information processing apparatus 10 to which an information processing apparatus, a power saving transition program, and a power saving transition method of a first embodiment are applied.

FIG. 1 is a view illustrating the schematic configuration of an information processing apparatus 10 to which an information processing apparatus, a power saving transition program, and a power saving transition method of a first embodiment are applied. As illustrated in FIG. 1, the information processing apparatus 10 includes a plurality of computation nodes 102 to 110 each having a CPU 1 (hereinafter also referred to as a processor 1 or a processor chip 1) that executes an assigned job, a liquid-cooling cooler 127 that cools a conduit 121 in which a refrigerant that cools the processor 1 of each of the plurality of computation nodes 102 to 110 circulates and the refrigerant in the conduit 121, a control node 101 to which the plurality of computation nodes 102 to 110 and the cooler 127 are connected, and a temperature sensor 122 that detects the temperature of the refrigerant (e.g., cooling water) circulating in the conduit 121.

The computation nodes 102 to 110, the cooler 127, and the temperature sensor 122 are connected to the control node 101 via a network NW.

Each of the computation nodes 102 to 110 is a computer that includes the processor 1 and a main memory 2. The processor 1 of each of the computation nodes 102 to 110 executes a job execution program 6 loaded into the main memory 2 to execute a job assigned by the control node 101 in a non-power saving mode.

The control node 101 is a computer that includes a CPU 101a (hereinafter also referred to as a processor 101a) and a main memory 101b. The control node 101 may also be any of the computation nodes 102 to 110.

The processor 101a executes a control program 101d2 loaded into the main memory 101b to assign the job to the computation nodes 102 to 110. In addition, the processor 101a executes the control program 101d2 to cause the processor 1 of each of the computation nodes 102 to 110 in which execution of the job is ended and to which the job is not assigned to transition (change) from the non-power saving mode (job non-execution) to a power saving mode (job non-execution). Further, the processor 101a executes the control program 101d2 to control the cooling power of the cooler 127. The cooling power of the cooler 127 is also referred to as cooling capability, and represents an amount of heat that can be removed per unit time (the unit is a watt (W)).

The control program 101d2 is an example of the power saving transition program. The power saving transition program includes job assignment control for assigning the job to the computation nodes 102 to 110, control for causing the processor 1 of each of the computation nodes 102 to 110 in which the execution of the job is ended and to which the job is not assigned to transition from the non-power saving mode (job non-execution) to the power saving mode (job non-execution), and cooling power control for controlling the cooling power of the cooler 127.

Job Assignment Control

Figure 2:
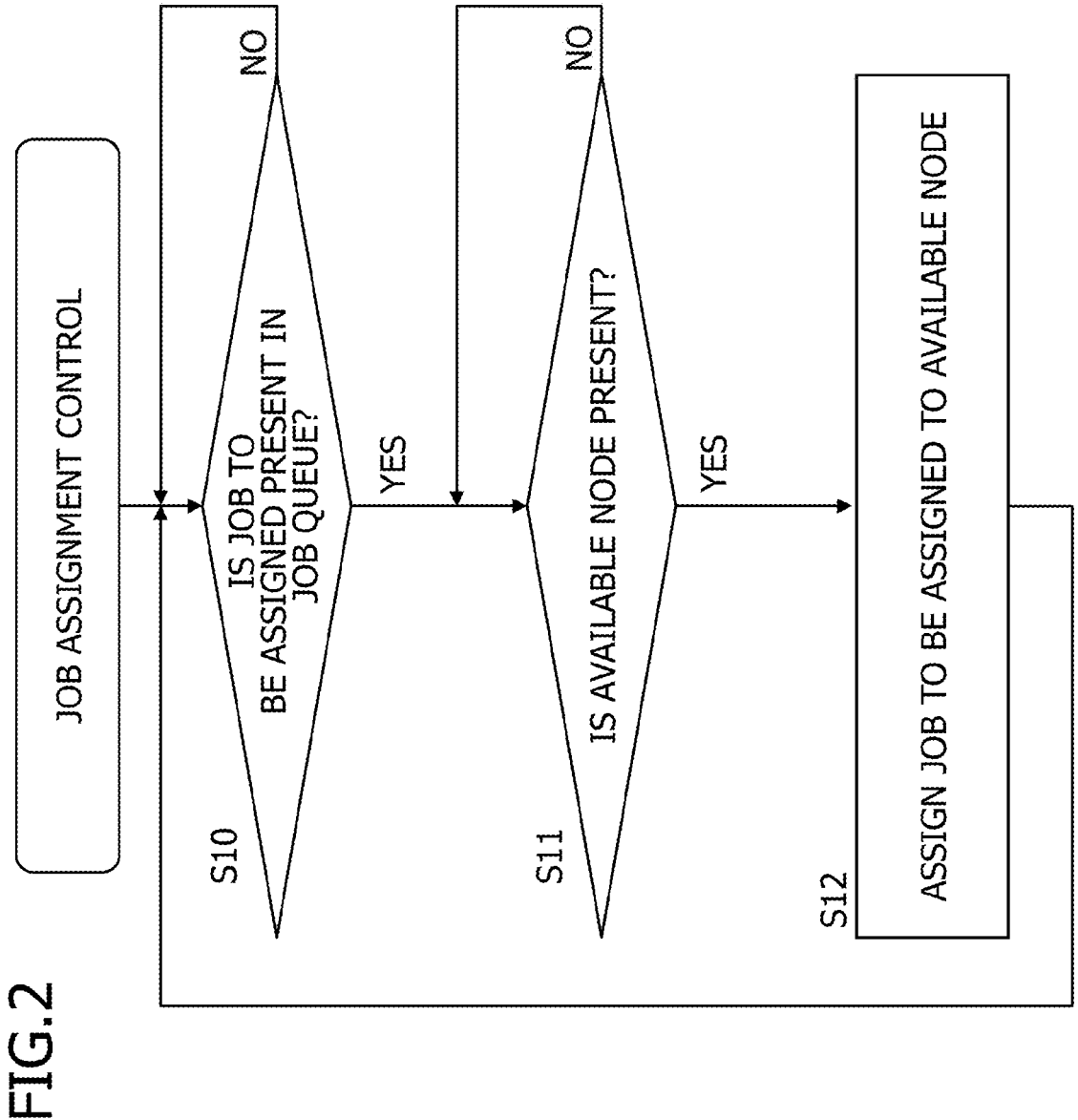
FIG. 2 is a flowchart for illustrating the job assignment control of the control program 101$d$2.

FIG. 2 is a flowchart for illustrating the job assignment control of the control program 101d2.

The processor 101a of the control node 101 executes the control program 101d2 to perform the following process.

The processor 101a of the control node 101 determines whether or not a job to be assigned is present in a job queue (S10). Although not illustrated, the job queue is stored in, e.g., the main memory 101b of the control node 101. The job to be assigned is a job that is scheduled to be assigned to the computation node.

As the result of the determination in S10, in the case where it is determined that the job to be assigned is not present in the job queue (S10: NO), the processor 101a of the control node 101 waits until the job to be assigned is stored in the job queue and it is determined that the job to be assigned is present in the job queue.

On the other hand, as the result of the determination in S10, in the case where it is determined that the job to be assigned is present in the job queue (S10: YES), the processor 101a of the control node 101 determines whether or not an available node is present (S11). The available node is a computation node that is not executing the job.

As the result of the determination in S11, in the case where it is determined that the available node is not present (S11: NO), the processor 101a of the control node 101 waits until the execution of the job is ended and it is determined that the available node is present.

On the other hand, as the result of the determination in S11, in the case where it is determined that the available node is present (S11: YES), the processor 101a of the control node 101 assigns the job to be assigned to the available node (S12).

Thereafter, the processor 101a of the control node 101 repeatedly executes S10 to S12.

Cooling Power Control

Figure 3:
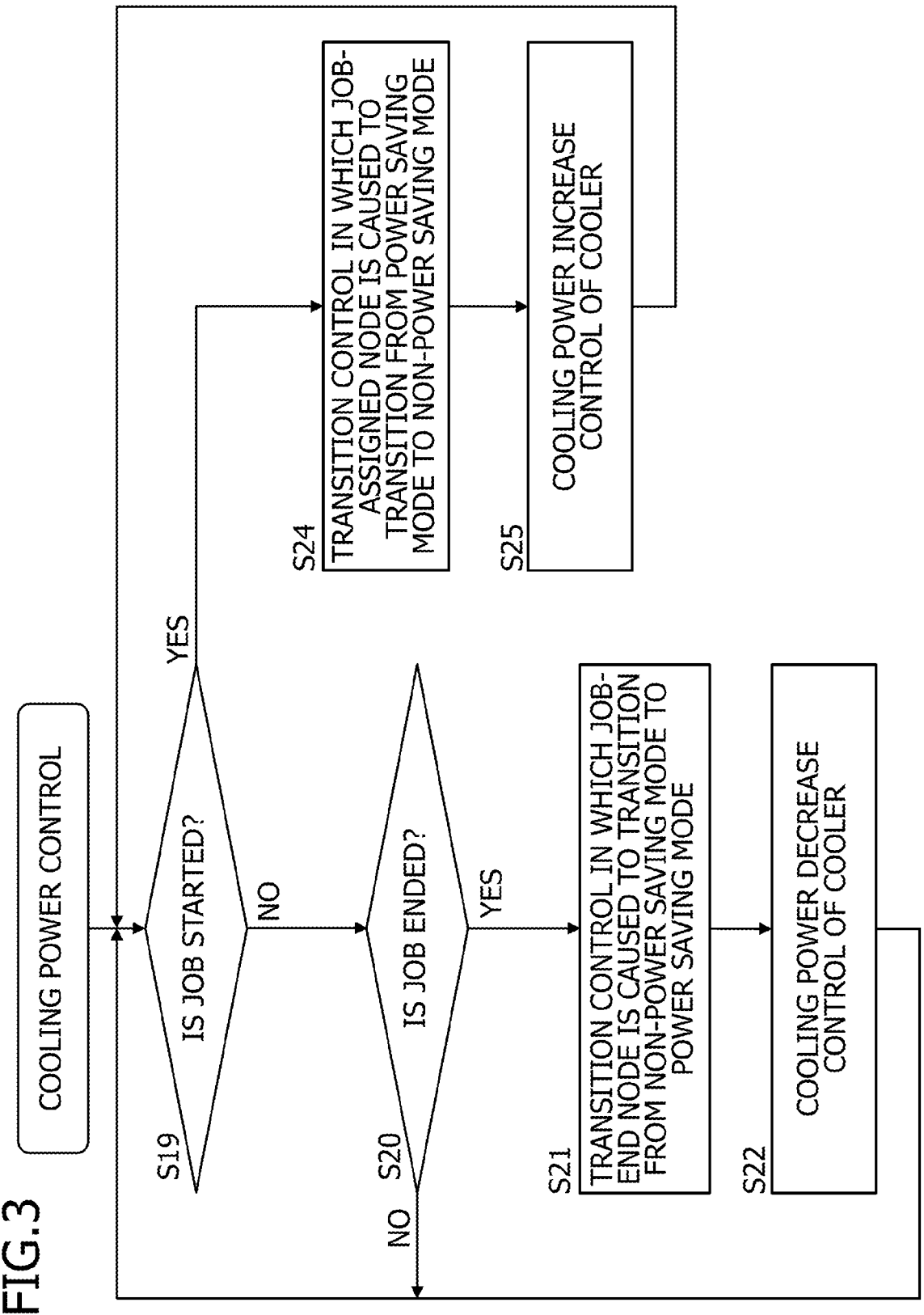
FIG. 3 is a flowchart for illustrating the summary of the cooling power control of the control program 101$d$2.

FIG. 3 is a flowchart for illustrating the summary of the cooling power control of the control program 101d2.

The processor 101a of the control node 101 executes the control program 101d2 to perform the following process.

In the case where the computation node to which the job is assigned in S12 (hereinafter also referred to a job-assigned node) starts the execution of the job (S19: YES), the processor 101a of the control node 101 performs transition control in which the job-assigned node is caused to transition from the power saving mode to the non-power saving mode (S24). Concurrently with S24, the processor 101a of the control node 101 executes cooling power increase control of the cooler 127 (S25). Specifically, the processor 101a of the control node 101 controls the cooling power of the cooler 127 such that the cooling power increases by a predetermined extent.

On the other hand, in the case where the computation node ends the execution of the job (S19: NO, S20: YES), the processor 101a of the control node 101 performs the transition control in which the processor 1 of a job-end node is caused to transition from the non-power saving mode (job non-execution) to the power saving mode (job non-execution) (S21). The job-end node is the computation node to which the job is assigned in S12 and in which the execution of the assigned job is ended.

Concurrently with S12, the processor 101a of the control node 101 executes cooling power decrease control of the cooler 127 (S22). Specifically, the processor 101a of the control node 101 controls the cooling power of the cooler 127 such that the cooling power decreases by a predetermined extent.

Thereafter, the processor 101a of the control node 101 repeatedly executes S19 to S25. The present embodiment relates to an improvement in the control in each of S21 and S22.

Figure 4:
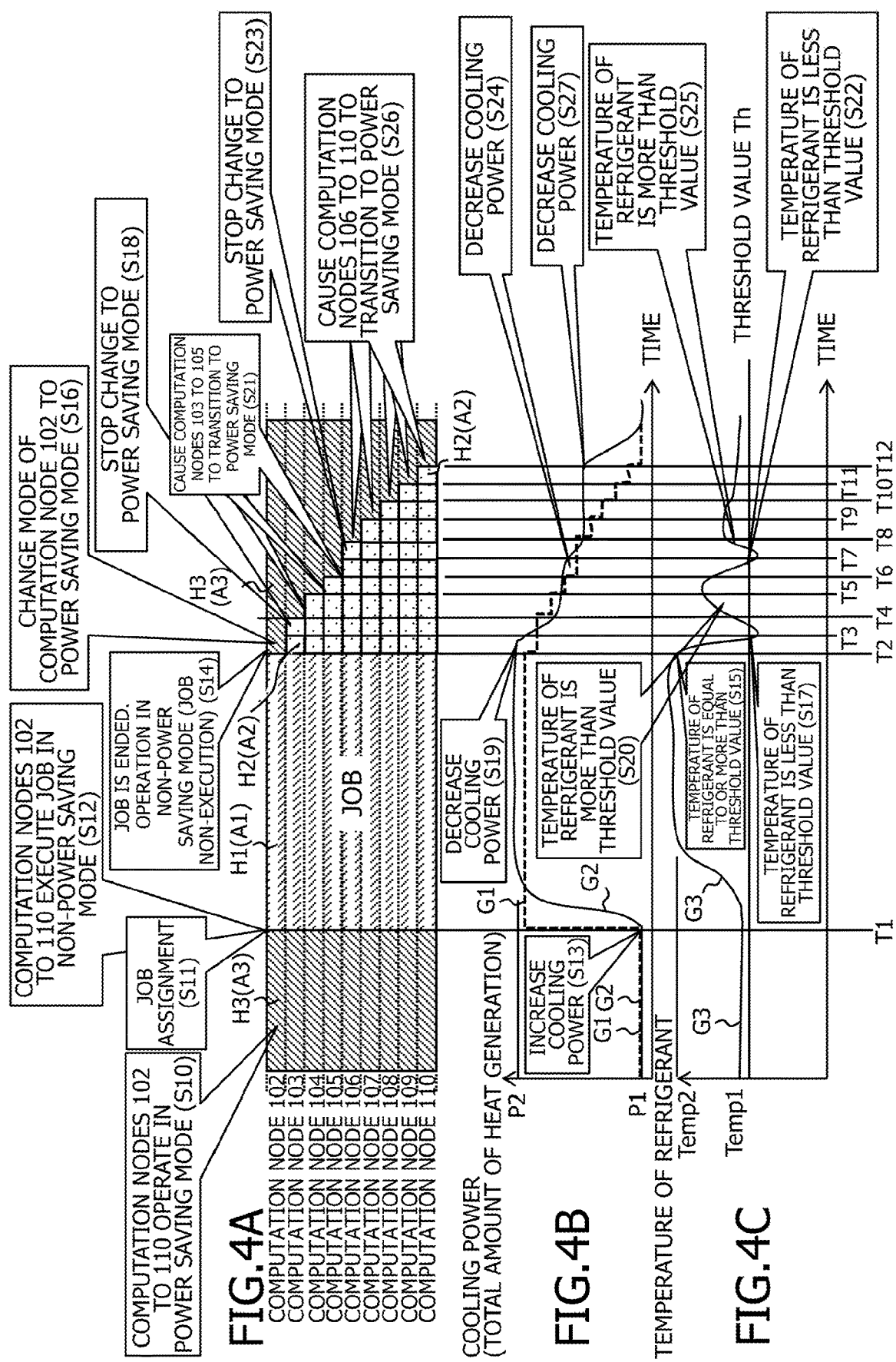
FIGS. 4A to 4C are views for illustrating the cooling power control of the control program 101$d$2 in detail.

FIGS. 4A to 4C are views for illustrating the cooling power control of the control program 101d2 in detail.

FIG. 4A illustrates an example of the change of the state of each of the computation nodes 102 to 110 (processors 1) correspondingly to the time axis. As illustrated in FIG. 9, the state of each of the computation nodes 102 to 110 (processors 1) includes the non-power saving mode (job execution), the non-power saving mode (job non-execution), and the power saving mode (job non-execution). Power consumption (amount of heat generation) decreases in this order.

An area A1 hatched by a first hatch H1 in FIG. 4A denotes that the state of the corresponding computation node (processor 1) is the non-power saving mode (job execution).

In addition, an area A2 (a plurality of squares) hatched by a second hatch H2 in FIG. 4A denotes that the state of the corresponding computation node (processor 1) is the non-power saving mode (job non-execution). Further, an area A3 hatched by a third hatch H3 in FIG. 4A denotes that the state of the corresponding computation node (processor 1) is the power saving mode (job non-execution).

In FIG. 4B, an example of the change of the total amount of heat generation of the processors 1 of the respective computation nodes 102 to 110 (corresponding to FIG. 4A) is indicated by a dotted line G1, and an example of the change of the cooling power of the cooler 127 is indicted by a solid line G2. In FIG. 4C, an example of the change of the temperature of the refrigerant circulating in the conduit 121 that corresponds to FIG. 4A is indicated by a solid line G3.

Before Time T1

As illustrated in FIG. 4A, before time T1, the job is not assigned to the processor 1 of each of the computation nodes 102 to 110, and the processor 1 of each of the computation nodes 102 to 110 operates in the power saving mode (job non-execution) (S10).

As indicated by the dotted line G1 in FIG. 4B, before time T1, the total amount of heat generation of the processors 1 of the respective computation nodes 102 to 110 is P1 watts (W).

As indicated by the solid line G2 in FIG. 4B, before time T1, the cooling power of the cooler 127 is the cooling power that substantially matches the total amount of heat generation of the processors 1 in order to reduce an increase in temperature resulting from the total amount of heat generation of the processors 1 of the respective computation nodes 102 to 110.

Thus, before time T1, the total amount of heat generation of the processors 1 of the respective computation nodes 102 to 110 and the cooling power of the cooler 127 counterbalance each other at P1 watts.

Consequently, as indicated by the solid line G3 in FIG. 4C, before time T1, the temperature of the refrigerant circulating in the conduit 121 is controlled to a temperature Temp1 that allows the processors 1 to operate properly and prevents the refrigerant from being frozen.

Time T1

Next, the processor 101a of the control node 101 executes the job assignment control illustrated in FIG. 2 and, as illustrated in FIG. 4A, assigns the job to the computation nodes 102 to 110 at time T1 (S11). Subsequently, the processor 101a of the control node 101 instructs the computation nodes 102 to 110 to execute the assigned job via the network NW.

As illustrated in FIG. 4A, at time T1, the processor 1 of each of the computation nodes 102 to 110 transitions from the power saving mode (job non-execution) to the non-power saving mode, and executes the job assigned (submitted) by the control node 101 in the non-power saving mode (S12).

When the processor 1 of each of the computation nodes 102 to 110 executes the assigned (submitted) job in the non-power saving mode, the non-power saving mode (job execution) is higher in power consumption (amount of heat generation) than the power saving mode (job non-execution), and hence, as indicated by the dotted line G1 in FIG. 4B, the total amount of heat generation of the processors 1 of the respective computation nodes 102 to 110 increases to P2 watts.

The processor 101a of the control node 101 executes the cooling power increase control of the cooler 127 to increase the cooling power of the cooler 127 in order to reduce the increase in temperature resulting from the total amount of heat generation of the processors 1 of the respective computation nodes 102 to 110 in the non-power saving mode (job execution) (S13). Specifically, the control node 101 performs the control such that the cooling power of the cooler 127 is increased so as to counterbalance the total amount of heat generation of the processors 1 of the respective computation nodes 102 to 110 in the non-power saving mode (job execution).

Note that the time constant of each of the computation nodes 102 to 110 (processors 1) is relatively short (e.g., about several seconds to several tens of seconds), and hence the total amount of heat generation of the processors 1 of the respective computation nodes 102 to 110 increases rapidly due to the transition to the non-power saving mode (job execution). In contrast to this, the time constant of the cooler 127 is relatively long (e.g., about several tens of minutes), and hence the cooling power of the cooler 127 does not increase rapidly even when the cooling power increase control of the cooler 127 is performed, the cooling power thereof increases gradually from time T1 and, after a lapse of a predetermined time period, the total amount of heat generation of the computation nodes 102 to 110 in the non-power saving mode (job execution) and the cooling power of the cooler 127 counterbalance each other at P2 watts finally. Consequently, as indicated by the solid line G3 in FIG. 4C, the temperature of the refrigerant circulating in the conduit 121 increases gradually, and the increase stops at a temperature Temp2.

Time T2

Next, as illustrated in FIG. 4A, the processor 1 of each of the computation nodes 102 to 110 ends the execution of the assigned job at time T2, and transitions from the non-power saving mode (job execution) to the non-power saving mode (job non-execution) (S14).

In the case where the execution of the assigned jobs is ended in this manner, from the viewpoint of power savings, it is desirable to cause the processor 1 of each of the computation nodes 102 to 110 in which the execution of the assigned job is ended to transition from the non-power saving mode (job non-execution) to the power saving mode (job non-execution) simultaneously to bring the processors 1 into a power saving state, and execute the cooling power decrease control of the cooler 127 in order to prevent the refrigerant of the cooler 127 from being excessively cooled (frozen) (S21, S22 in FIG. 3).

However, as described above, the time constant of the change of the cooling power of the refrigerant after control for switching the cooling power of the cooler 127 is relatively long (e.g., about several tens of minutes), and hence a decrease in cooling power after the cooling power decrease control of the cooler 127 progresses gradually. In contrast to this, the time constant of the change of the amount of heat generation of the computation nodes 102 to 110 (processors 1) is relatively short (e.g., about several seconds to several tens of seconds), and hence a decrease in the total amount of heat generation after control for decreasing the amount of heat generation of the computation nodes 102 to 110 (processors 1) progresses rapidly.

Consequently, for example, when the cooling power decrease control of the cooler 127 is executed at the timing when the execution of the assigned job is ended, and the processor 1 of each of the computation nodes 102 to 110 in which the execution of the assigned job is ended is caused to transition from the non-power saving mode (job non-execution) to the power saving mode (job non-execution) simultaneously, the total amount of heat generation of the processors 1 of the respective computation nodes 102 to 110 falls below the cooling power of the cooler 127 until the decrease in cooling power catches up with the sharp decrease in the amount of heat generation. That is, the cooling power of the cooler 127 becomes excessive and redundant.

As a result, the refrigerant circulating in the conduit 121 is excessively cooled by the redundant cooling power, and the temperature of the refrigerant decreases rapidly. Consequently, the refrigerant may be frozen and expanded, the conduit 121 may be damaged, the refrigerant may leak from the damaged part, and peripheral electronic equipment may fail.

To cope with this, in the first embodiment, the processor 1 of each of a plurality of the computation nodes in which the execution of the job is ended is caused to transition from the non-power saving mode (job non-execution) to the power saving mode (job non-execution) one by one slowly and gradually (at predetermined time intervals) while the temperature of the refrigerant circulating in the conduit 121 is monitored such that the cooling power of the cooler 127 does not become excessive. Specifically, the cooling power control (S21, S22) illustrated in FIG. 3 is executed.

This enables the change of the decrease in the total amount of heat generation of the computation nodes to follow the change of the gradual decrease in the cooling power of the cooler 127.

As a result, it is possible to cause the processor 1 of each of the computation nodes 102 to 110 to transition from the non-power saving mode (job non-execution) to the power saving mode (job non-execution) while preventing the refrigerant circulating in the conduit 121 from being excessively cooled.

Cooling Power Control (S21, S22)

Figure 5:
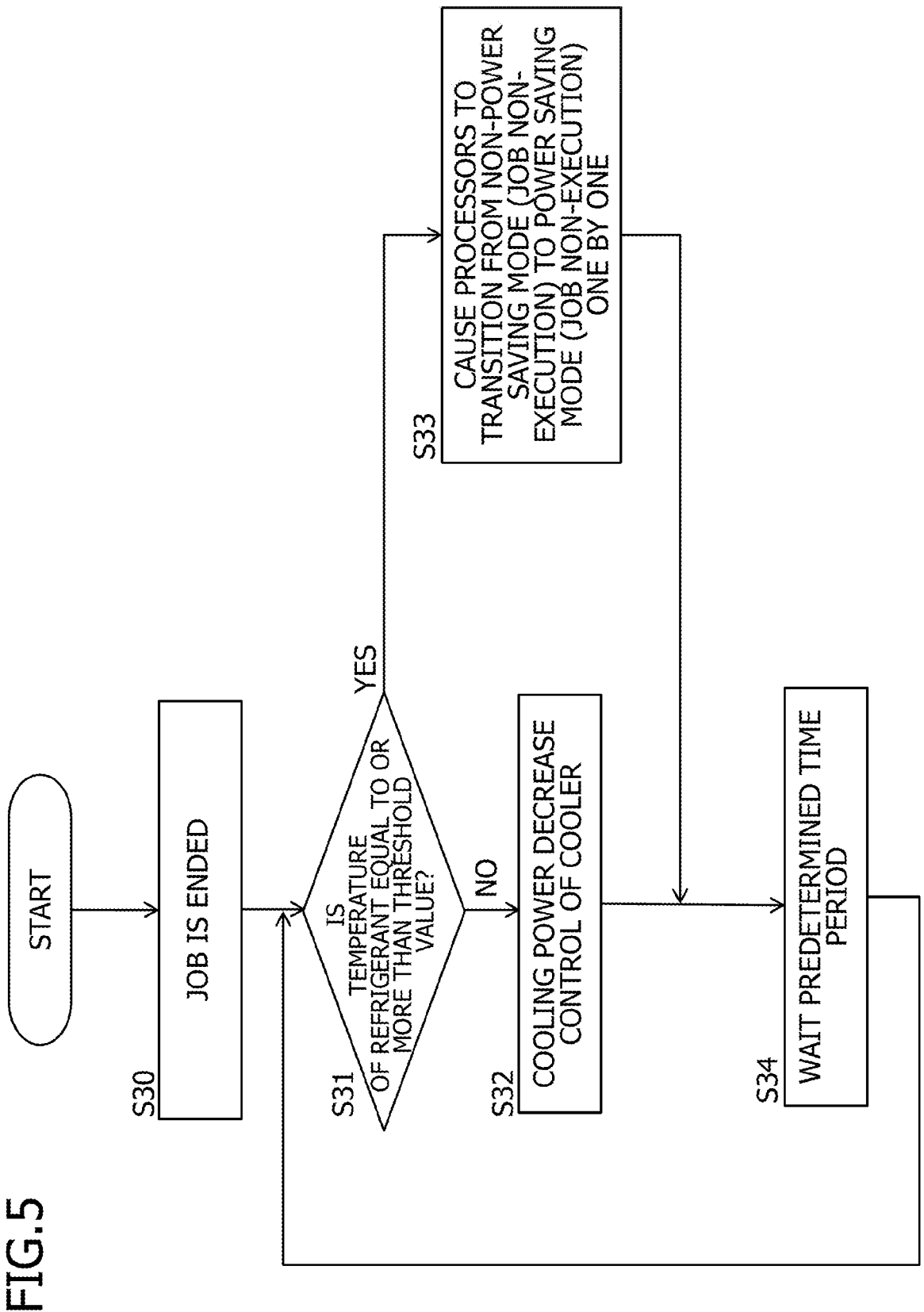
FIG. 5 is a flowchart for illustrating the cooling power control (S21, S22) illustrated in FIG. 3.

FIG. 5 is a flowchart for illustrating the cooling power control (S21, S22) illustrated in FIG. 3.

In the case where the execution of the job by the computation nodes 102 to 110 to which the job is assigned is ended (S30), the processor 101a of the control node 101 determines whether or not a temperature T of the refrigerant circulating in the conduit 121 that is detected by the temperature sensor 122 is equal to or more than a threshold value Th (S31).

As a result, in the case where the temperature T of the refrigerant is less than the threshold value Th (S31: NO), the processor 101a of the control node 101 executes the cooling power decrease control of the cooler 127 (S32) to decrease the cooling power of the cooler 127 by a predetermined extent.

On the other hand, as the result of the determination in S31, in the case where the temperature T of the refrigerant is equal to or more than the threshold value Th (S31: YES), the processor 101a of the control node 101 causes the processor 1 of each of a plurality of the computation nodes in which the execution of the job is ended in S30 to transition from the non-power saving mode (job non-execution) to the power saving mode (job non-execution) one by one at predetermined time intervals (S33).

Subsequently, the processor 101a of the control node 101 waits a predetermined time period (S34), and then repeatedly executes S31 to S34.

According to the control in FIG. 5, when the processor 101a of the control node 101 executes the control program 101d2 to end the job (S30), the processor 101a of the control node 101 performs the cooling power decrease control of the cooler 127 (S32) when the temperature T of the refrigerant<the threshold value Th is satisfied (S31: NO). This allows the cooling power of the cooler 127 to decrease gradually, and allows the temperature of the refrigerant to increase gradually. Subsequently, when the temperature T of the refrigerant>the threshold value Th is satisfied (S31: YES), the processor 101a of the control node 101 repeats the transition control in which the processor 1 of each of the computation nodes in which the job is ended is caused to transition to the power saving mode (job non-execution) one by one or a predetermined number of the processors 1 at a time at predetermined time intervals (S34). This enables the total amount of heat generation of the processors 1 of the respective computation nodes 102 to 110 to decrease gradually so as to follow the gradual decrease in the cooling power of the cooler 127.

After a while, when the temperature T of the refrigerant<the threshold value Th is satisfied, the processor 101a of the control node 101 executes the cooling power decrease control of the cooler 127 (S32) again, and stops the control in which the processor 1 of each of the job-end nodes is caused to transition to the power saving mode (job non-execution) one by one at predetermined time intervals (S33, S34).

Next, with reference to FIGS. 4A to 4C, the cooling power control (S21, S22) illustrated in FIG. 3 will be described in detail.

After the job is ended, the processor 101a of the control node 101 determines whether or not the temperature T of the refrigerant circulating in the conduit 121 that is detected by the temperature sensor 122 is equal to or more than the threshold value Th at predetermined timings between T2 and T12.

Subsequently, in the case where the temperature T of the refrigerant detected by the temperature sensor 122 is equal to or more than the threshold value Th, the processor 101a of the control node 101 causes the processor 1 of each of a plurality of the computation nodes 102 to 110 in which the execution of the jobs is ended to transition from the non-power saving mode (job non-execution) to the power saving mode (job non-execution) one by one slowly and gradually (at predetermined time intervals).

For example, as indicated by the solid line G3 in FIG. 4C, the temperature T of the refrigerant detected by the temperature sensor 122 is equal to or more than the threshold value Th at time T2 immediately after the job is ended (S15), and hence the processor 101a of the control node 101 changes the mode of the processor 1 of the computation node 102 from the non-power saving mode (job non-execution) to the power saving mode (job non-execution) (S16).

In addition, the temperature T of the refrigerant detected by the temperature sensor 122 is equal to or more than the threshold value Th between time T4 and time T6, and hence the processor 101a of the control node 101 causes the processor 1 of each of the computation nodes 103 to 105 to transition from the non-power saving mode (job non-execution) to the power saving mode (job non-execution) one by one at their respective timings between time T4 and time T6 (S21).

Further, the temperature T of the refrigerant detected by the temperature sensor 122 is equal to or more than the threshold value Th also between time T8 and time T12, and hence the processor 101a of the control node 101 causes the processor 1 of each of the computation nodes 106 to 110 to transition from the non-power saving mode (job non-execution) to the power saving mode (job non-execution) one by one at their respective timings between time T8 and time T12 (S26).

On the other hand, when the mode of the processor 1 of each of the computation nodes 102 to 110 is changed from the non-power saving mode (job non-execution) to the power saving mode (job non-execution) (S16, S21, S26), there are cases where the total amount of heat generation of the processors 1 of the respective computation nodes 102 to 110 falls below the cooling power of the cooler 127. That is, there are cases where the cooling power of the cooler 127 becomes excessive and redundant. The same applies to the case where the processor 1 of each of the computation nodes 102 to 110 is caused to transition from the non-power saving mode (job execution) to the non-power saving mode (job non-execution) having lower power consumption (amount of heat generation) (S14).

For example, at time T2, the processor 1 of each of the computation nodes 102 to 110 ends the assigned job, and transitions from the non-power saving mode (job execution) to the non-power saving mode (job non-execution) having a smaller amount of heat generation (S14). In addition, at time T2, the mode of the processor 1 of the computation node 102 is changed from the non-power saving mode (job non-execution) to the power saving mode (job non-execution) having a smaller amount of heat generation (S16).

With this, the amount of heat generation G1 of the processor 1 having the relatively short time constant decreases rapidly and, as indicated by the dotted line G1 and the solid line G2 between time T2 and time T3 in FIG. 4B, there are cases where the total amount of heat generation of the processors 1 of the respective computation nodes 102 to 110 falls below the cooling power of the cooler 127. That is, there are cases where the cooling power of the cooler 127 becomes excessive and redundant.

As a result, the refrigerant circulating in the conduit 121 is excessively cooled by the redundant cooling power and, as indicated by the solid line G3 between time T2 and time T3 in FIG. 4C, the temperature of the refrigerant decreases rapidly. Consequently, the refrigerant may be frozen and expanded, the conduit 121 may be damaged, the refrigerant may leak from the damaged part, and peripheral electronic equipment may fail.

To cope with this, in the case where the temperature T of the refrigerant detected by the temperature sensor 122 is less than the threshold value Th, the processor 101a of the control node 101 stops the change of the mode of the computation node to the power saving mode, and executes the cooling power decrease control of the cooling power of the cooler 127 to decrease the cooling power of the cooler 127. That is, the cooling power of the cooler 127 is decreased while the total amount of heat generation of the processors 1 of the respective computation nodes 102 to 110 is maintained. Specifically, the control node 101 controls the cooling power of the cooler 127 such that the cooling power decreases by a predetermined extent. This allows the cooling power of the cooler 127 to decrease gradually due to its relatively long time constant.

For example, at time T3, the temperature T of the refrigerant detected by the temperature sensor 122 is less than the threshold value Th (S17), and hence the processor 101a of the control node 101 stops the change of the mode of the processor 1 of the computation node 103 to the power saving mode (S18), and executes the cooling power decrease control of the cooling power of the cooler 127 to decrease the cooling power of the cooler 127 by a predetermined extent (S19).

As indicated by the dotted line G1 and the solid line G2 between time T3 and time T4 in FIG. 4B, this enables the total amount of heat generation of the processors 1 of the respective computation nodes 102 to 110 to exceed the cooling power of the cooler 127. That is, the total amount of heat generation of the processors 1 of the respective computation nodes 102 to 110 becomes excessive.

As a result, as indicated by the solid line G3 between time T3 and time T4 in FIG. 4C, the temperature of the refrigerant circulating in the conduit 121 starts to increase. This prevents the refrigerant circulating in the conduit 121 from being excessively cooled.

Note that, since the time constant of the cooler 127 is relatively long, even when the cooling power decrease control of the cooler 127 is executed, the cooling power of the cooler 127 does not decreases rapidly but decreases gradually, as indicated by the solid line G2 between time T3 and time T4 in FIG. 4B.

When the temperature of the refrigerant circulating in the conduit 121 starts to increase, and the temperature of the refrigerant detected by the temperature sensor 122 becomes equal to or more than the threshold value Th (see, e.g., time T4 to time T6 in FIG. 4C), the processor 101a of the control node 101 resumes the process of causing the processor 1 of each of the computation nodes 103 to 105 to transition from the non-power saving mode (job non-execution) to the power saving mode (job non-execution) one by one at their respective timings between time T4 and time T6 (S21).

Thus, when the processor 1 of each of the computation nodes 103 to 105 is caused to transition from the non-power saving mode (job non-execution) to the power saving mode (job non-execution) one by one, there are cases where the total amount of heat generation of the processors 1 of the respective computation nodes 102 to 110 falls below the cooling power of the cooler 127 at time T6. That is, there are cases where the cooling power of the cooler 127 becomes excessive and redundant.

As a result, the refrigerant circulating in the conduit 121 is excessively cooled by the redundant cooling power and, as indicated by the solid line G3 between time T6 and time T7 in FIG. 4C, the temperature of the refrigerant decreases rapidly. Thus, the risk of freezing the refrigerant is increased again.

To cope with this, in the case where the temperature T of the refrigerant detected by the temperature sensor 122 is less than the threshold value Th, the control node 101 stops the change of the mode of the computation node to the power saving mode, and executes the cooling power decrease control of the cooling power of the cooler 127 to decrease the cooling power of the cooler 127. That is, the cooling power of the cooler 127 is decreased while the total amount of heat generation of the processors 1 of the respective computation nodes 102 to 110 is maintained.

For example, the temperature T of the refrigerant detected by the temperature sensor 122 is less than the threshold value Th at time T7 (S22), and hence the processor 101a of the control node 101 stops the change of the mode of the processor 1 of the computation node 103 to the power saving mode (S23), and executes the cooling power decrease control of the cooling power of the cooler 127 to decrease the cooling power of the cooler 127 by a predetermined extent (S24).

Note that, since the time constant of the cooler 127 is relatively long, even when the cooling power decrease control of the cooler 127 is executed, the cooling power of the cooler 127 does not decrease rapidly but decreases gradually, as indicated by the solid line G2 between time T7 and time T8 in FIG. 4B.

As indicated by the dotted line G1 and the solid line G2 between time T7 and time T8 in FIG. 4B, this enables the total amount of heat generation of the processors 1 of the respective computation nodes 102 to 110 to exceed the cooling power of the cooler 127. That is, the total amount of heat generation of the processors 1 of the respective computation nodes 102 to 110 becomes excessive.

As a result, as indicated by the solid line G3 between time T7 and time T8 in FIG. 4C, the temperature of the refrigerant circulating in the conduit 121 starts to increase. This prevents the refrigerant circulating in the conduit 121 from being excessively cooled.

When the temperature of the refrigerant circulating in the conduit 121 starts to increase, and the temperature T of the refrigerant detected by the temperature sensor 122 becomes equal to or more than the threshold value Th (see, e.g., time T8 to time T12 in FIG. 4C), the processor 101a of the control node 101 resumes the process of causing the processor 1 of each of the computation nodes 106 to 110 to transition from the non-power saving mode (job non-execution) to the power saving mode (job non-execution) one by one at their respective timings between time T8 and time T12 (S26).

Subsequently, after all of the processors 1 of the respective computation nodes 102 to 110 are caused to transition to the power saving mode, the processor 101a of the control node 101 executes the cooling power decrease control of the cooler 127 to decrease the cooling power of the cooler 127 to P1 that is the cooling power before time T1 (S27).

Detail of First Embodiment

Figure 6:
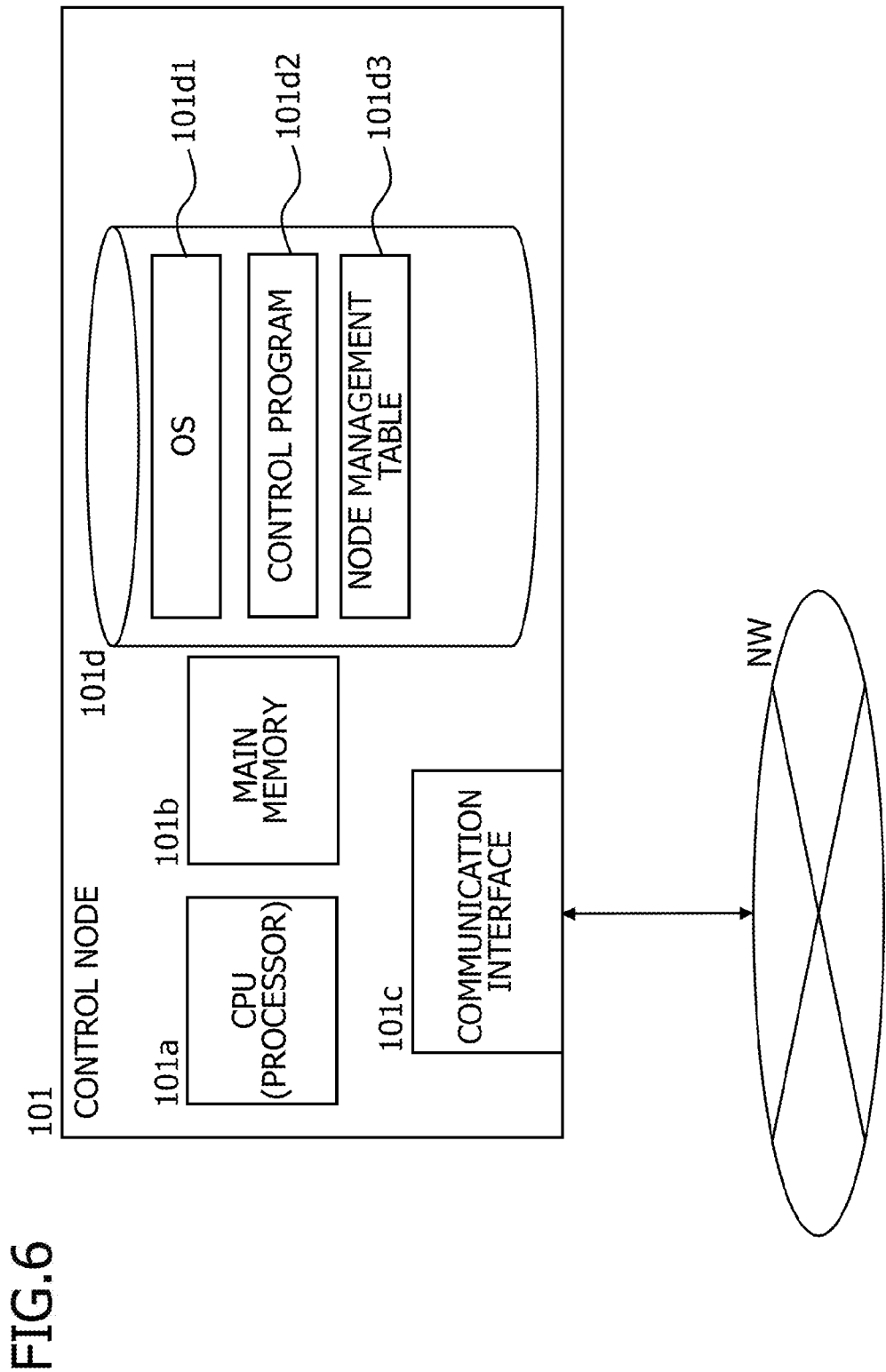
FIG. 6 illustrates an example of the configuration of the control node 101.

FIG. 6 illustrates an example of the configuration of the control node 101. The control node 101 includes the CPU 101a (hereinafter also referred to as the processor 101a), the main memory 101b, a communication interface 101c to which the computation nodes 102 to 110, the cooler 127, and the temperature sensor 122 are connected via the network NW, and a storage 101d serving as an auxiliary storage apparatus. Although not illustrated, the processor 101a, the main memory 101b, the communication interface 101c, and the storage 101d are connected to each other via a bus or the like. An operating system (OS) 101d1 and the control program 101d2 are stored in the storage 101d, and these programs are loaded into the main memory 101b, and are executed by the processor 101a. In addition, a node management table 101d3 is stored in the storage 101d.

FIGS. 7A and 7B illustrate examples of the node management table 101d3. Node IDs serving as identification information for identifying a plurality of the computation nodes 102 to 110 and the states of the processors 1 of the respective computation nodes 102 to 110 identified by the node IDs are associated with each other and are stored in the node management table 101d3. The state of the processor 1 includes the non-power saving mode (job execution), the non-power saving mode (job non-execution), and the power saving mode (job non-execution). Every time the state of the processor 1 of each of the computation nodes 102 to 110 is changed, the processor 101a of the control node 101 reflects the change in the node management table 101d3. For example, in the case where the state of the processor 1 of the computation node 102 whose node ID is 102 is changed from the non-power saving mode (job non-execution) to the power saving mode (job non-execution) when the state of the node management table 101d3 is a state illustrated in FIG. 7A, the processor 101a of the control node 101 reflects the change in the node management table 101d3, and the state of the node management table 101d3 is thereby changed to a state illustrated in FIG. 7B.

Figure 8:
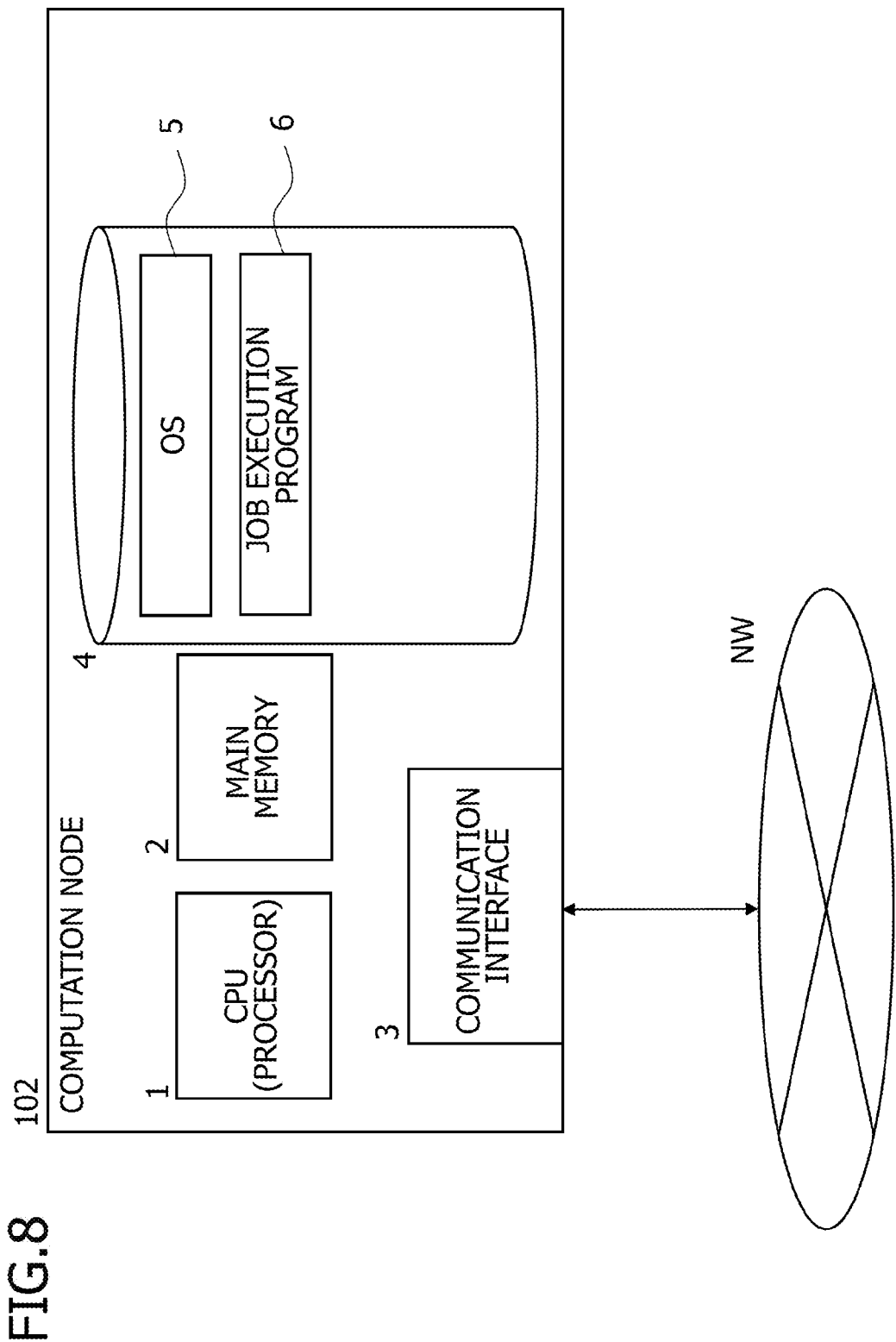
FIG. 8 illustrates an example of the configuration of the computation node.

FIG. 8 illustrates an example of the configuration of the computation node. The computation nodes 102 to 110 have the same configuration, and hence, hereinbelow, the configuration of the computation node 102 representing the other computation nodes will be mainly described. The computation node 102 includes the CPU 1 (hereinafter also referred to as the processor 1), the main memory 2, a communication interface 3 to which the control node 101 and the other computation nodes 103 to 110 are connected via the network NW, and a storage 4 serving as an auxiliary storage apparatus. Although not illustrated, the processor 1, the main memory 2, the communication interface 3, and the storage 4 are connected to each other via a bus or the like. An operating system (OS) 5 and the job execution program 6 are stored in the storage 4, and these programs are loaded into the main memory 2, and are executed by the processor 1.

FIG. 9 is a view for illustrating the state of the processor 1 of each of the computation nodes 102 to 110. In the case of the non-power saving mode (job execution), the processor 1 of each of the computation nodes 102 to 110 operates, e.g., with a power consumption of 140 to 200 W on a 3-GHz clock (an operating frequency of a processor). In the case of the non-power saving mode (job non-execution), the processor 1 of each of the computation nodes 102 to 110 operates, e.g., with a power consumption of 70 to 80 W on a 3-GHz clock (the operating frequency of the processor). In the case of the power saving mode (job non-execution), the processor 1 of each of the computation nodes 102 to 110 operates, e.g., with a power consumption of 20 W.

The processor 101a of the control node 101 executes the control program 101d2 to cause the processor 1 of each of the computation nodes 102 to 110 to transition from the non-power saving mode (job non-execution) to the power saving mode (job non-execution).

The power saving mode can be implemented by reducing the clock (the operating frequency of the processor) to a value lower than that of the clock in the non-power saving mode (job non-execution) (e.g., reducing the clock to 1.2 GHz from 3 GHz). In addition, in the case where the processor 1 of each of the computation nodes 102 to 110 includes a plurality of cores, the power saving mode can be implemented by turning off power supplied to the cores other than part of the cores (suspend mode). Further, the power saving mode can be implemented by limiting a bandwidth when the processor 1 accesses the main memory 2. Furthermore, the power saving mode can be implemented by performing control to inhibit the processor 1 from using a single instruction multiple data (SIMD) command. The power saving mode can also be implemented by the other various methods. For example, the power saving mode can be implemented by appropriately combining the above methods.

Figure 10:
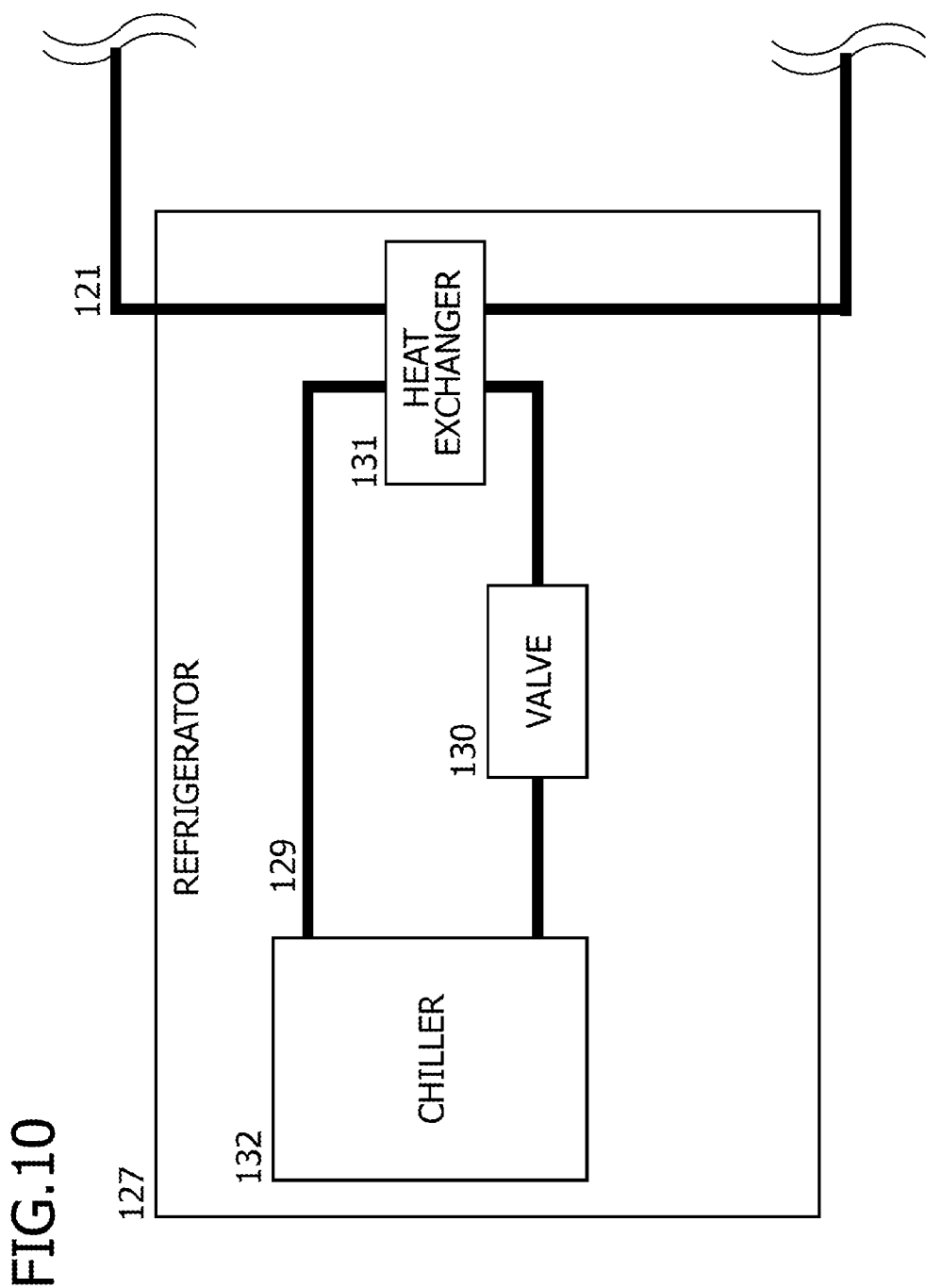
FIG. 10 illustrates an example of the configuration of the cooler 127.

FIG. 10 illustrates an example of the configuration of the cooler 127. The cooler 127 includes a chiller 132 that has a refrigerator and a pump (both not illustrated), a conduit 129 in which a refrigerant cooled by the chiller 132 circulates and that is cooled by the refrigerant, a valve 130 that controls the flow rate of the refrigerant circulating in the conduit 129, and a heat exchanger 131 that cools the refrigerant in the conduit 121 by performing heat exchange between the conduit 129 and the conduit 121.

The processor 101a of the control node 101 executes the control program 101d2 to control the cooling power of the cooler 127. For example, the processor 101a of the control node 101 controls the cooling power of the cooler 27 stepwise by controlling the opening of the valve 130 such that, among a plurality of cooling powers obtained by dividing the range between the cooling power P1 watts and the cooling power P2 watts illustrated in FIG. 4B (e.g., the range therebetween is divided such that the number of resultant cooling powers matches the number of the computation nodes 102 to 110), the cooler 127 has a specific cooling power. The cooling power of the cooler 127 may also be controlled stepwise by controlling the chiller 132 (controlling, e.g., the refrigeration power of the refrigerator or the speed of the pump).

Figure 11:
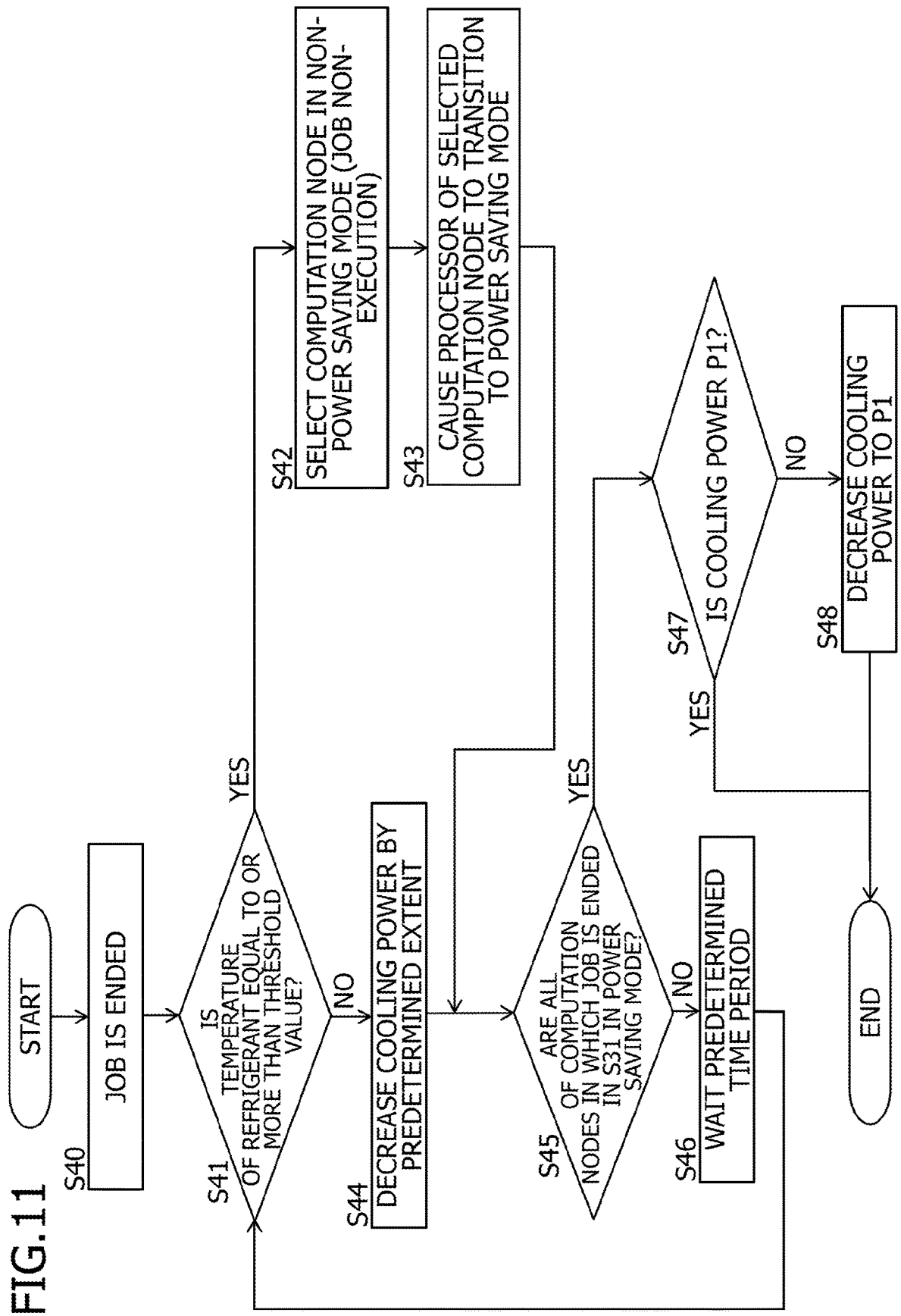
FIG. 11 is a flowchart for illustrating the cooling power control of the control program 101$d$2 in greater detail.

FIG. 11 is a flowchart for illustrating the cooling power control of the control program 101d2 in greater detail.

The processor 101a of the control node 101 executes the control program 101d2 to perform the following process.

In the case where the job by the processor 1 of each of the computation nodes 102 to 110 is ended (S40), the processor 101a of the control node 101 acquires the temperature of the refrigerant from the temperature sensor of the cooler 127, and determines whether or not the acquired temperature T of the refrigerant is equal to or more than the threshold value Th (S41).

As a result, in the case where the temperature T of the refrigerant is equal to or more than the threshold value Th (S41: YES), the processor 101a of the control node 101 selects one of the computation nodes in the non-power saving mode (job non-execution) by referring to the node management table 101d3 (S42), and changes the mode of the processor 1 of the selected computation node from the non-power saving mode (job non-execution) to the power saving mode (job non-execution) (S34). The processor 101a of the control node 101 then reflects the change in the node management table 101d3.

On the other hand, as the result of the determination in S41, in the case where the temperature T of the refrigerant is less than the threshold value Th (S41: NO), the processor 101a of the control node 101 executes the cooling power decrease control of the cooler 127 to decrease the cooling power of the cooler 127 by a predetermined extent (S44).

Next, the processor 101a of the control node 101 determines whether or not all of the processors 1 of the respective computation nodes 102 to 110 in which the job is ended in S40 are in the power saving mode by referring to the node management table 101d3 (S45).

As a result, in the case where all of the processors 1 of the respective computation nodes 102 to 110 in which the job is ended in S40 are not in the power saving mode (S45: NO), the processor 101a of the control node 101 waits a predetermined time period (S46).

Subsequently, the processor 101a of the control node 101 repeatedly executes S40 to S46 described above until it is determined that all of the processors 1 of the respective computation nodes 102 to 110 in which the job is ended in S40 are in the power saving mode in S45 (S45: YES).

On the other hand, in S45, in the case where it is determined that all of the processors 1 of the respective computation nodes 102 to 110 in which the job is ended in S40 are in the power saving mode (S45: YES), the processor 101a of the control node 101 determines whether or not the cooling power of the cooler 127 is P1 watts that is the cooling power before time T1 (S47).

As a result, in the case where the cooling power of the cooler 127 is not P1 watts (S47: NO), the processor 101a of the control node 101 executes the cooling power decrease control of the cooler 127 to decrease the cooling power of the cooler 127 to P1 watts that is the cooling power before time T1 (S48), and ends the process. On the other hand, in the case where the cooling power of the cooler 127 is P1 watts (S47: YES), the processor 101a of the control node 101 ends the process.

As described thus far, according to the present embodiment, in the case where the temperature T of the refrigerant is less than the threshold value Th (S41: NO), the processor 101a of the control node 101 executes the cooling power decrease control of the cooler 127 to decrease the cooling power by a predetermined extent (S44). On the other hand, in the case where the temperature T of the refrigerant is equal to or more than the threshold value Th (S41: YES), the processor 101a of the control node 101 causes the processor 1 of each of a plurality of the computation nodes in which the execution of the job is ended to transition from the non-power saving mode (job non-execution) to the power saving mode (job non-execution) one by one at predetermined time intervals (S42, S43).

This enables the cooling power of the cooler 127 having the relatively long time constant (e.g., about several tens of minutes) and decreasing gradually to match (substantially match) the total amount of heat generation of the processors 1 of the respective computation nodes each having the relatively short time constant (e.g., about several seconds to several tens of seconds) and decreasing rapidly.

As a result, it is possible to cause the processor 1 of each of the computation nodes 102 to 110 to transition from the non-power saving mode (job non-execution) to the power saving mode (job non-execution) while preventing the refrigerant circulating in the conduit 121 from being excessively cooled. In addition, it is possible to prevent the above problem caused by the excessive cooling of the refrigerant circulating in the conduit 121, i.e., the problem where the refrigerant is frozen and expanded, the conduit 121 is damaged, the refrigerant leaks from the damaged part, and peripheral electronic equipment fails.

Second Embodiment

FIG. 12 is a view illustrating the schematic configuration of an information processing apparatus 10A to which an information processing apparatus, a power saving transition program, and a power saving transition method of a second embodiment are applied. As illustrated in FIG. 12, in the information processing apparatus 10A, a plurality of computation nodes 111 to 119, a cooler 128 that cools a conduit 123 in which a refrigerant that cools the processors 1 (processor chips) of the plurality of computation nodes 111 to 119 circulates and the refrigerant in the conduit 123, and a temperature sensor 124 that detects the temperature of the refrigerant (e.g., cooling water) circulating in the conduit 123 are added to the configuration of the information processing apparatus 10 of the first embodiment.

Similarly to the computation nodes 102 to 110, each of the computation nodes 111 to 119 is a computer that includes the processor 1 and the main memory 2.

The computation nodes 111 to 119, the cooler 128, and the temperature sensor 124 are connected to the control node 101 via the network NW.

FIG. 13 illustrates an example of the node management table 101d3 used in the second embodiment. In the node management table 101d3 used in the second embodiment, cooler IDs for identifying the coolers 127 and 128 to which the computation nodes 102 to 119 identified by the node IDs belong are added to the node management table 101d3 used in the first embodiment that is illustrated in FIGS. 7A and 7B.

FIG. 14 illustrates an example of the change of the state of the processor 1 of each of the computation nodes 102 to 109 correspondingly to the time axis.

An area A1_1 hatched by a hatch H1_1 in FIG. 14 denotes that the state of each of the corresponding computation nodes 102 to 104 (processors 1) is the non-power saving mode (first job execution).

In addition, an area A1_2 hatched by a hatch H1_2 in FIG. 14 denotes that the state of each of the corresponding computation nodes 105 to 109 (processors 1) is the non-power saving mode (second job execution).

Further, the area A2 (a plurality of squares) hatched by the hatch H2 in FIG. 14 denotes that the state of the corresponding computation node (processor 1) is the non-power saving mode (job non-execution).

Furthermore, the area A3 hatched by the hatch H3 in FIG. 14 denotes that the state of the corresponding computation node (processor 1) is the power saving mode (job non-execution).

As illustrated in FIG. 14, a job is not assigned to the processor 1 of each of the computation nodes 102 to 104, and the processor 1 of each of the computation nodes 102 to 104 operates in the power saving mode (job non-execution) before time T1_2. A first job is assigned to the processor 1 of each of the computation nodes 102 to 104 by the control node 101 at time T1_2, and the processor 1 of each of the computation nodes 102 to 104 executes the first job between time T1_2 and time T1_3, and ends the execution of the first job at time T1_3.

A job is not assigned to the processor 1 of each of the computation nodes 105 to 119, and the processor 1 of each of the computation nodes 105 to 119 operates in the power saving mode (job non-execution) before time T1_1. A second job is assigned to the processor 1 of each of the computation nodes 105 to 119 by the control node 101 at time T1_1, and the processor 1 of each of the computation nodes 105 to 119 executes the second job between time T1_1 and time T2, and ends the execution of the second job at time T2.

Figure 15:
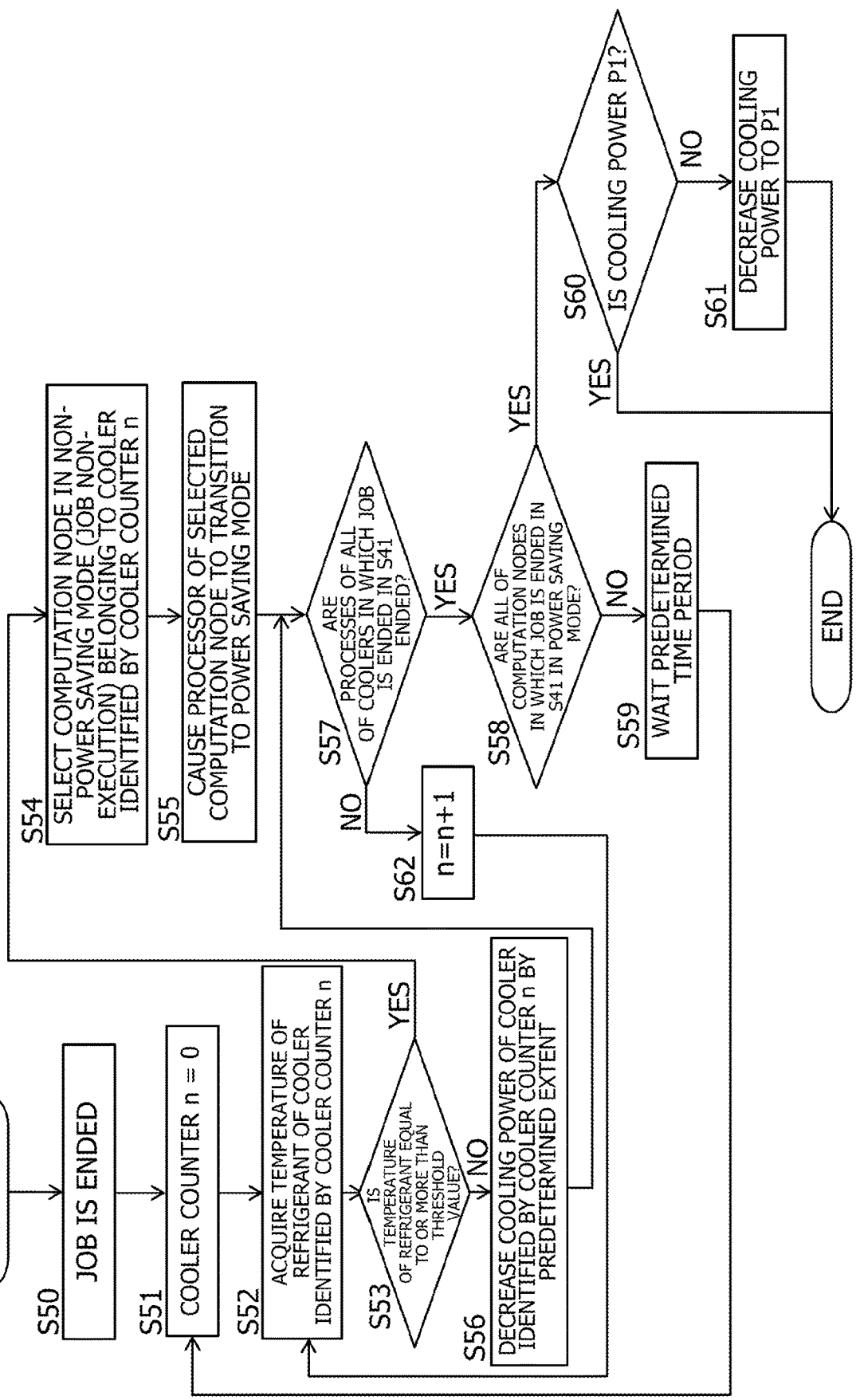
FIG. 15 is a flowchart for illustrating the cooling power control of the control program 101d2 in detail.

FIG. 15 is a flowchart for illustrating the cooling power control of the control program 101d2 in detail.

The processor 101a of the control node 101 executes the control program 101d2 to perform the following process.

Case where First Job is Ended

In the case where the first job by the computation nodes 102 to 104 is ended (S50), the processor 101a of the control node 101 sets 0 in a cooler counter n for identifying the cooler (S51).

Next, the processor 101a of the control node 101 acquires the temperature T of the refrigerant from the temperature sensor 122 of the cooler 127 identified by the cooler counter n (S52).

Next, the processor 101a of the control node 101 determines whether or not the temperature T of the refrigerant acquired in S52 is equal to or more than the threshold value Th (S53).

As a result, in the case where the temperature T of the refrigerant acquired in S52 is equal to or more than the threshold value Th (S53: YES), the processor 101a of the control node 101 selects one of the computation nodes in the non-power saving mode (job non-execution) belonging to the cooler 127 identified by the cooler counter n by referring to the node management table 101d3 (S54), and changes the mode of the processor 1 of the selected computation node from the non-power saving mode (job non-execution) to the power saving mode (job non-execution) (S55). The processor 101a of the control node 101 then reflects the change in the node management table 101d3.

On the other hand, as the result of the determination in S53, in the case where the temperature T of the refrigerant acquired in S52 is less than the threshold value Th (S53: NO), the control node 101 executes the cooling power decrease control of the cooler 127 to decrease the cooling power of the cooler 127 identified by the cooler counter n by a predetermined extent (S56).

Next, the processor 101a of the control node 101 determines whether or not the processes of all of the coolers in which the first job is ended in S50 are ended (S57).

Herein, the first job has been executed only in the computation nodes 102 to 104 belonging to the cooler 127 identified by the cooler counter n, and hence it is determined that the processes of all of the coolers in which the first job is ended in S50 are ended (S57: YES).

Next, the processor 101a of the control node 101 determines whether or not all of the computation nodes 102 to 104 in which the first job is ended in S50 are in the power saving mode by referring to the node management table 101d3 (S58).

As a result, in the case where all of the computation nodes 102 to 104 in which the first job is ended in S50 are not in the power saving mode (S58: NO), the processor 101a of the control node 101 waits a predetermined time period (S59).

Subsequently, the processor 101a of the control node 101 repeatedly executes S51 to S59 described above until it is determined that all of the computation nodes 102 to 104 in which the first job is ended in S50 are in the power saving mode in S58 (S58: YES).

On the other hand, in the case where it is determined that all of the computation nodes 102 to 104 in which the first job is ended in S50 are in the power saving mode in S58 (S58: YES), the processor 101a of the control node 101 determines whether or not the cooling power of the cooler 127 is P1 watts that is the cooling power before time T1_2 (S60).

As a result, in the case where the cooling power of the cooler 127 is not P1 watts that is the cooling power before time T1_2 (S60: NO), the processor 101a of the control node 101 decreases the cooling power of the cooler 127 to P1 watts that is the cooling power before time T1_2 (S61), and ends the process. On the other hand, in the case where the cooling power of the cooler 127 is P1 watts that is the cooling power before time T1_2 (S60: YES), the processor 101a of the control node 101 ends the process.

Case where Second Job is Ended

In the case where the second job by the computation nodes 105 to 119 is ended (S50), the processor 101a of the control node 101 sets 0 in the cooler counter n for identifying the cooler (S51).

Next, the processor 101a of the control node 101 acquires the temperature T of the refrigerant from the temperature sensor 122 of the cooler 127 identified by the cooler counter n (S52).

Next, the processor 101a of the control node 101 determines whether or not the temperature T of the refrigerant acquired in S52 is equal to or more than the threshold value Th (S53).

As a result, in the case where the temperature T of the refrigerant acquired in S52 is equal to or more than the threshold value Th (S53: YES), the processor 101a of the control node 101 selects one of the computation nodes in the non-power saving mode (job non-execution) belonging to the cooler 127 identified by the cooler counter n by referring to the node management table 101d3 (S54), and changes the mode of the processor 1 of the selected computation node from the non-power saving mode (job non-execution) to the power saving mode (job non-execution) (S55). The processor 101a of the control node 101 then reflects the change in the node management table 101d3.

On the other hand, as the result of the determination in S53, in the case where the temperature T of the refrigerant acquired in S52 is less than the threshold value Th (S53: NO), the processor 101a of the control node 101 executes the cooling power decrease control of the cooler 127 to decrease the cooling power of the cooler 127 identified by the cooler counter n by a predetermined extent (S56).

Next, the processor 101a of the control node 101 determines whether or not the processes of all of the coolers in which the second job is ended in S50 are ended (S57).

Herein, the second job is executed not only in the computation nodes 105 to 110 belonging to the cooler 127 identified by the cooler counter n but also in the computation nodes 111 to 119 belonging to the cooler 128, and hence it is determined that the processes of all of the coolers in which the second job is ended in S50 are not ended (S57: NO).

Next, the processor 101a of the control node 101 increments the cooler counter n by 1 (S62).

Next, the processor 101a of the control node 101 returns to S52, and acquires the temperature T of the refrigerant from the temperature sensor 124 of the cooler 128 identified by the cooler counter n (S52).

Next, the processor 101a of the control node 101 determines whether or not the temperature T of the refrigerant acquired in S52 is equal to or more than the threshold value Th (S53).

As a result, in the case where the temperature T of the refrigerant acquired in S52 is equal to or more than the threshold value Th (S53: YES), the processor 101a of the control node 101 selects one of the computation nodes in the non-power saving mode (job non-execution) belonging to the cooler 128 identified by the cooler counter n by referring to the node management table 101d3 (S54), and changes the mode of the processor 1 of the selected computation node 102 from the non-power saving mode (job non-execution) to the power saving mode (job non-execution) (S55). The processor 101a of the control node 101 then reflects the change in the node management table 101d3.

On the other hand, as the result of the determination in S53, in the case where the temperature T of the refrigerant acquired in S52 is less than the threshold value Th (S53: NO), the processor 101a of the control node 101 executes the cooling power decrease control of the cooler 128 to decrease the cooling power of the cooler 128 identified by the cooler counter n by a predetermined extent (S56).

Next, the processor 101a of the control node 101 determines whether or not the processes of all of the coolers in which the second job is ended in S50 are ended (S57).

Herein, it is determined that the processes of both of the coolers 127 and 128 are ended (S57: YES).

Next, the processor 101a of the control node 101 determines whether or not all of the computation nodes 105 to 119 in which the second job is ended in S50 are in the power saving mode by referring to the node management table 101d3 (S58).

As a result, in the case where all of the computation nodes 105 to 119 in which the second job is ended in S50 are not in the power saving mode (S58: NO), the processor 101a of the control node 101 waits a predetermined time period (S59).

Subsequently, the processor 101a of the control node 101 repeatedly executes S51 to S59 and S62 described above until it is determined that all of the computation nodes 105 to 119 in which the second job is ended in S50 are in the power saving mode in S58 (S58: YES).

On the other hand, in the case where it is determined that all of the computation nodes 105 to 119 in which the second job is ended in S50 are in the power saving mode in S58 (S58: YES), the processor 101a of the control node 101 determines whether or not the cooling power of each of the coolers 127 and 128 is P1 watts that is the cooling power before time T1_2 (S60).

As a result, in the case where the cooling power of each of the coolers 127 and 128 is not P1 watts that is the cooling power before time T1_2 (S60: NO), the processor 101a of the control node 101 decreases the cooling power of each of the coolers 127 and 128 to P1 watts that is the cooling power before time T1_2 (S61), and ends the process. On the other hand, in the case where the cooling power of each of the coolers 127 and 128 is P1 watts that is the cooling power before time T1_2 (S60: YES), the processor 101a of the control node 101 ends the process.

As described thus far, according to the present embodiment, in the case where the temperature T of the refrigerant is less than the threshold value Th (S53: NO), the processor 101a of the control node 101 executes the cooling power decrease control of each of the coolers 127 and 128 to decrease the cooling power by a predetermined extent (S56). On the other hand, in the case where the temperature T of the refrigerant is equal to or more than the threshold value Th (S53: YES), the processor 101a of the control node 101 causes the processor 1 of each of a plurality of the computation nodes in which the execution of the job is ended to transition from the non-power saving mode (job non-execution) to the power saving mode (job non-execution) one by one at predetermined time intervals (S54, S55).

This enables the cooling power of each of the coolers 127 and 128 each having the relatively long time constant (e.g., about several tens of minutes) and decreasing gradually to match (substantially match) the total amount of heat generation of the computation nodes each having the relatively short time constant (e.g., about several seconds to several tens of seconds) and decreasing rapidly.

As a result, it is possible to cause the processor 1 of each of the computation nodes 102 to 119 to transition from the non-power saving mode (job non-execution) to the power saving mode (job non-execution) while preventing the refrigerants circulating in the conduits 121 and 123 from being excessively cooled. In addition, it is possible to prevent the above problem caused by the excessive cooling of the refrigerants circulating in the conduits 121 and 123, i.e., the problem where the refrigerants are frozen and expand, the conduits 121 and 123 are damaged, the refrigerants leak from the damaged parts, and peripheral electronic equipment fails.

Third Embodiment

In the case where a new third job is submitted at time T5 (see FIG. 18) after the end of the second job, the new third job is normally assigned to any computation node in which the job is not executed.

However, when the new third job is assigned to the computation node having transitioned to the power saving mode, the temperature of the computation node is excessively increased until the cooling power catches up with the total amount of heat generation of the processor 1 of the computation node that executes the newly assigned third job in the non-power saving mode.

To cope with this, in a third embodiment, in the case where the new third job is submitted, frequency of excessive increase of the temperature of the computation node is reduced by executing a process (hereinafter also referred to as a job preferential assignment process) of assigning the job preferentially to the computation node not in the power saving mode but in the non-power saving mode (job non-execution).

Figure 18:
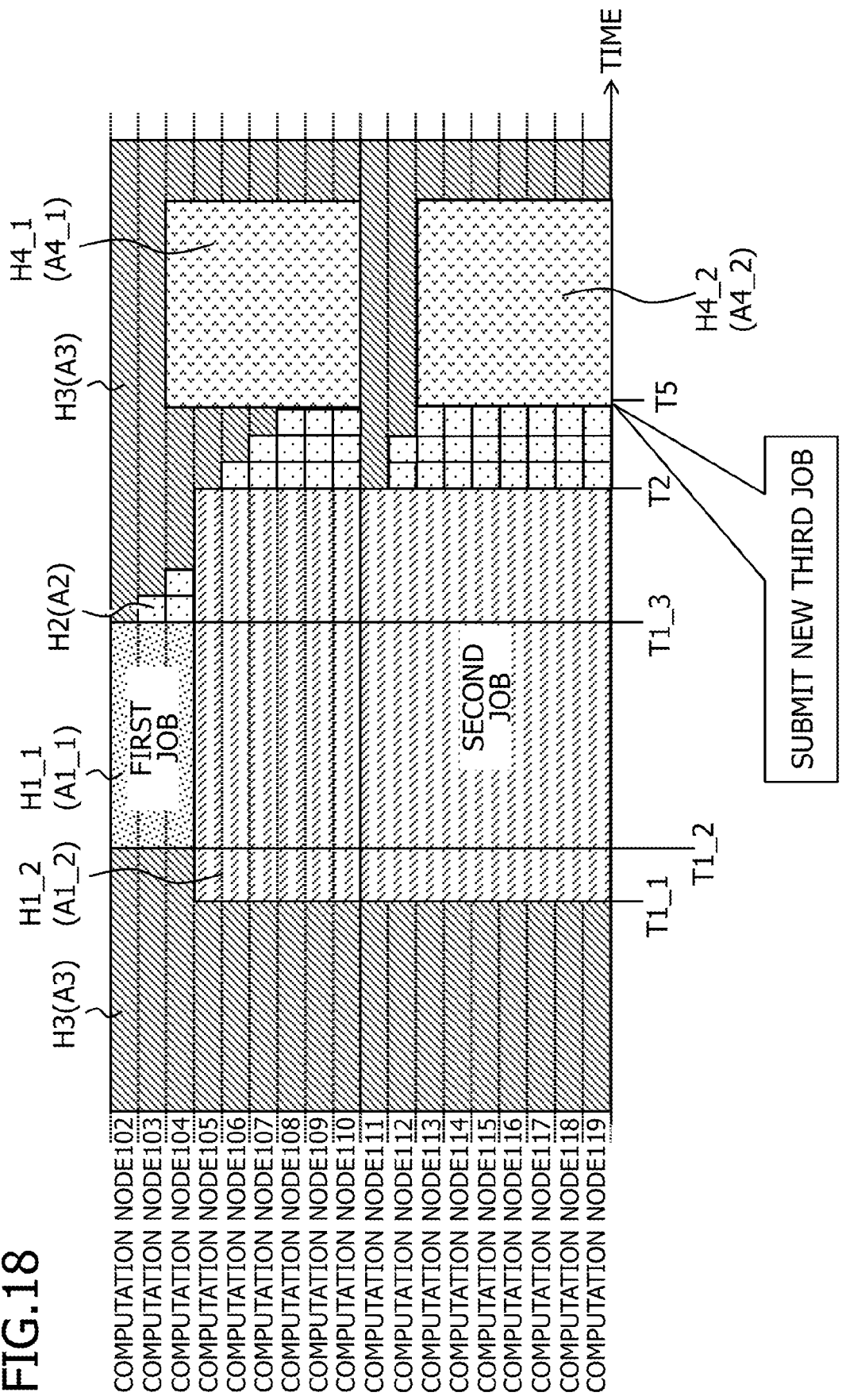
FIG. 18 is a view for illustrating the computation node to which the new third job is assigned in the case where the new third job is submitted at time T5.

Hereinbelow, as the third embodiment, a description will be given of a process (hereinafter also referred to as the job preferential assignment process) in which, as illustrated in FIG. 18, in the case where a user submits the new third job, e.g., at time T5 after the end of the second job in the information processing apparatus 10A of the second embodiment, the control node 101 assigns the submitted third job preferentially to a non-power saving mode (job non-execution).

Case where Computation Nodes 102 to 119 are Directly Connected (Case of Direct Network)

Figure 16:
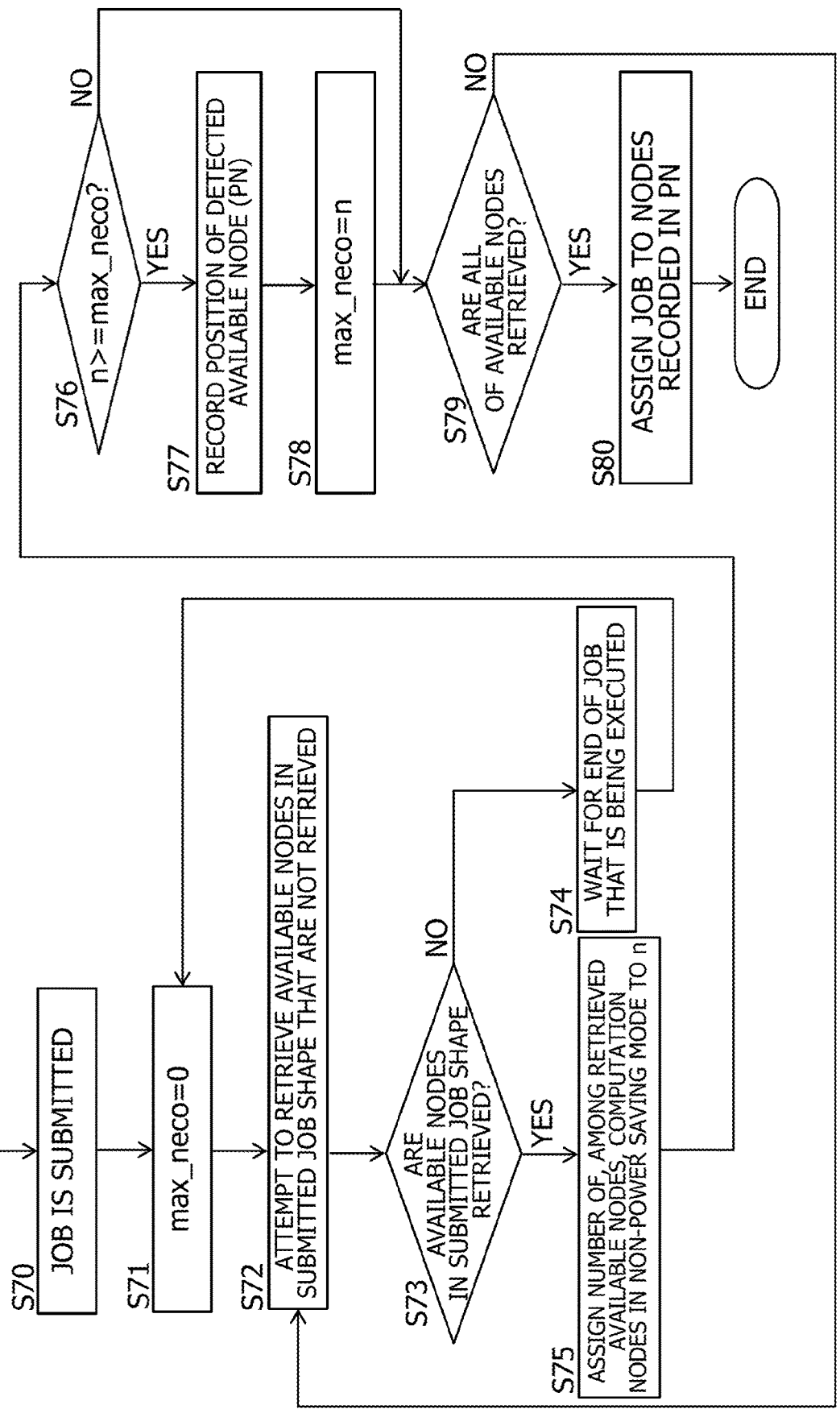
FIG. 16 is a flowchart for illustrating the job preferential assignment process in the case where the computation nodes 102 to 119 are directly connected (in the case of a direct network).
Figure 17:
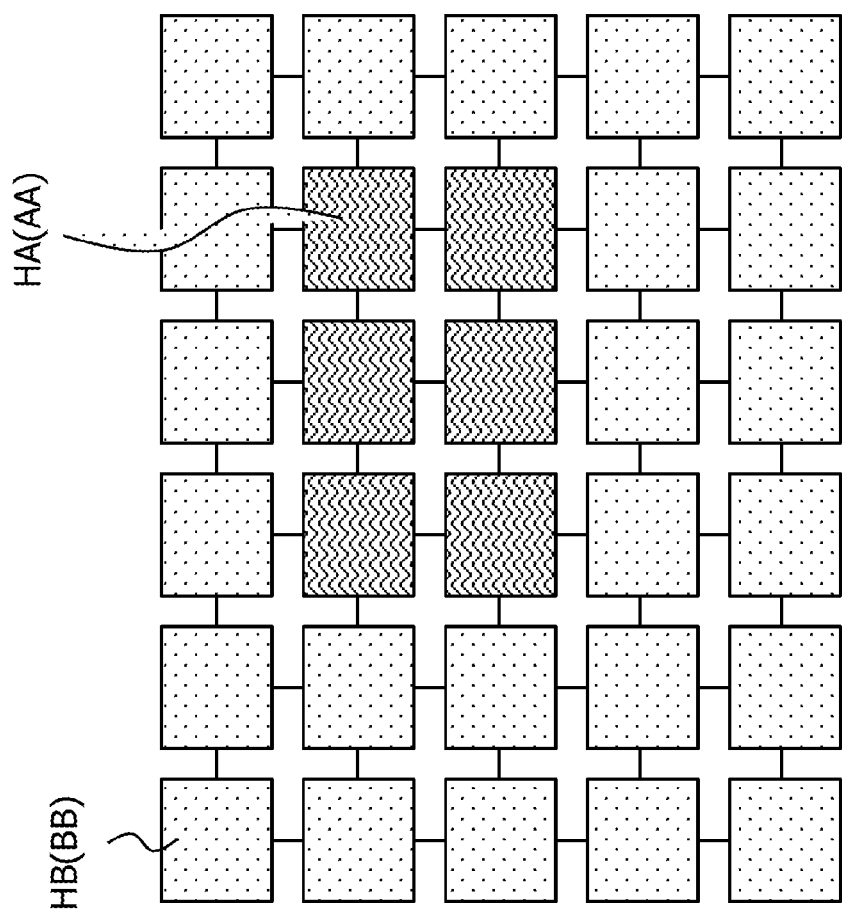
FIG. 17 illustrates the image of the direct network.

FIG. 16 is a flowchart for illustrating the job preferential assignment process in the case where the computation nodes 102 to 119 are directly connected (in the case of a direct network). FIG. 17 illustrates the image of the direct network. In FIG. 17, a plurality of squares represent computation nodes (processors 1). Note that, for easier understanding of the description, FIG. 17 depicts squares (computation nodes (processors 1)) larger in number than the computation nodes 102 to 109. An area AA (a plurality of squares) hatched by a hatch HA in FIG. 17 denotes that the state of the corresponding computation node (processor 1) is the non-power saving mode (job non-execution). In addition, an area BB (a plurality of squares) hatched by a hatch HB denotes that the state of the corresponding computation node (processor 1) is the power saving mode (job non-execution).

In the case where a user specifies a job shape and submits a job (S70), the processor 101a of the control node 101 assigns 0 to a variable max_neco (S71). The area AA (a plurality of squares) hatched by the hatch HA in FIG. 17 is an example of the job shape.

Next, the processor 101a of the control node 101 retrieves available nodes in a submitted job shape that have not yet been retrieved (S72).

Next, the processor 101a of the control node 101 determines whether or not the available nodes in the submitted job shape are retrieved (S73).

As a result, in the case where the available nodes are not retrieved (S73: NO), the processor 101a of the control node 101 waits for the end of the job that is being executed, and executes S71 to S73 again.

On the other hand, as the result of the determination in S73, in the case where the available nodes are retrieved (S73: YES), the processor 101a of the control node 101 assigns the number of, among the retrieved available nodes, computation nodes in the non-power saving mode to a variable n (S75).

Next, the processor 101a of the control node 101 determines whether or not the variable n>=variable max_neco is satisfied (S76).

As a result, in the case where the variable n>=variable max_neco is satisfied (S76: YES), the processor 101a of the control node 101 records the position of the detected available node (non-power saving mode) (S77). The processor 101a records the position thereof in, e.g., a variable PN.

Next, the processor 101a of the control node 101 assigns the content of the variable n to the variable max_neco (S78).

Next, the processor 101a of the control node 101 determines whether or not all of the available nodes are retrieved (S79).

As a result, in the case where all of the available nodes are retrieved (S79: YES), the processor 101a of the control node 101 assigns the job to the nodes (computation nodes) recorded in the variable PN (S80).

On the other hand, as the result of the determination in S79, in the case where all of the available node are not retrieved (S79: NO), the processor 101a of the control node 101 repeatedly executes S72 to S79 until all of the available nodes are retrieved (S79: YES).

It is possible to retrieve the available nodes in the submitted job shape with the larger number of the non-power saving modes by using S76 to S78, and hence it is possible to assign the job to more computation nodes in the non-power saving mode.

For example, as illustrated in FIG. 18, in the case where the new third job is submitted at time T5, it is possible to assign the job to more computation nodes in the non-power saving mode in an area A4_2 hatched by a hatch H4_2 than in an area A4_1 hatched by a hatch H4_1. In this case, the processor 101a of the control node 101 assigns the third job not to the computation nodes 104 to 110 corresponding to the area A4_1 but to the computation nodes 113 to 119 corresponding to the area A4_2. FIG. 18 is a view for illustrating the computation node to which the new third job is assigned in the case where the new third job is submitted at time T5.

As described above, according to the process in FIG. 16, in the case where the new third job is submitted at time T5 (see FIG. 18) after the end of the second job, it is possible to assign the new third job to more computation nodes in the non-power saving mode. Consequently, it is possible to reduce the frequency of excessive increase of the temperature of the computation node.

Case where Computation Nodes 102 to 119 are Indirectly Connected (Case of Indirect Network)

Figure 19:
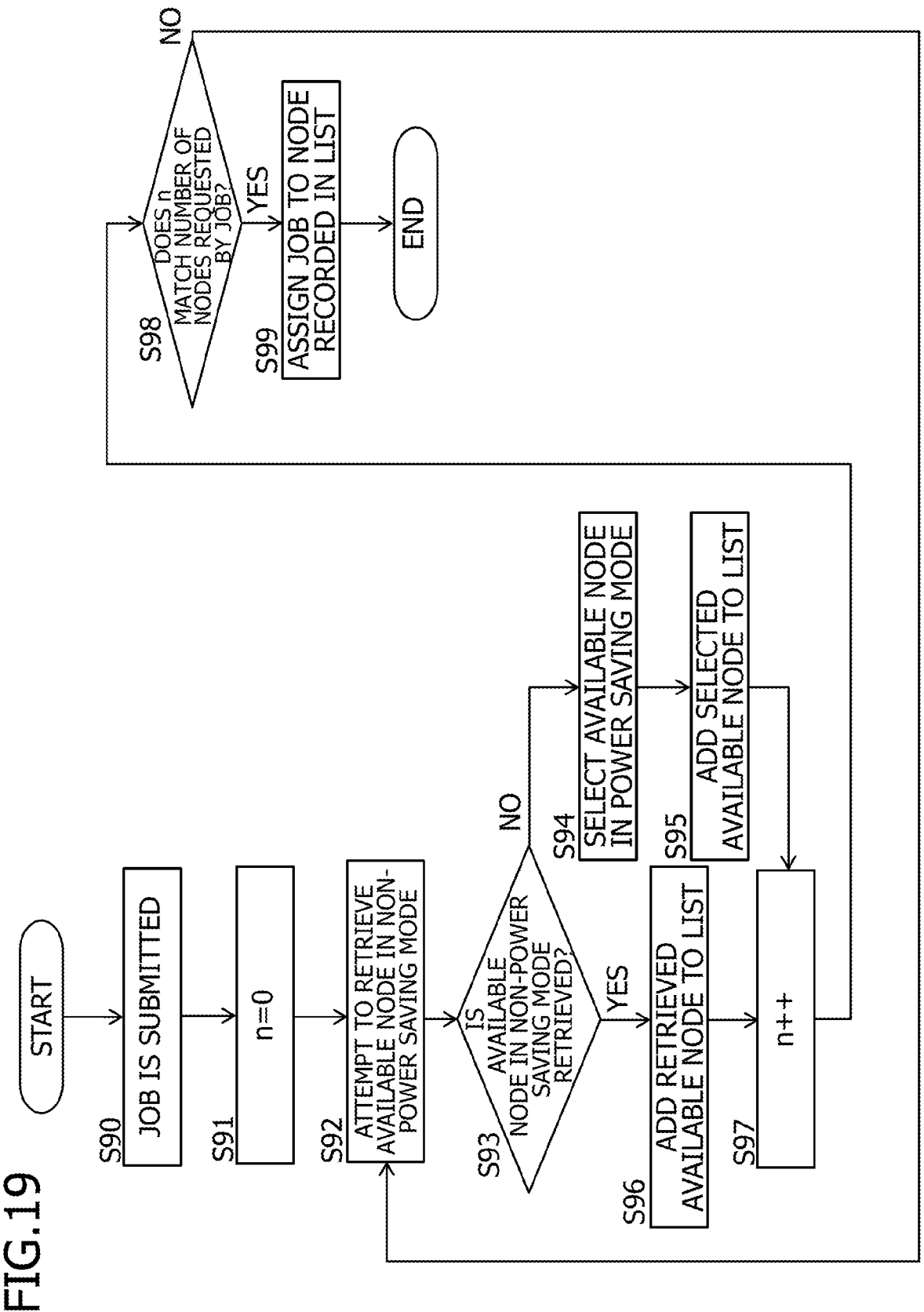
FIG. 19 is a flowchart for illustrating the job preferential assignment process in the case where the computation nodes 102 to 119 are connected indirectly via a switch (not illustrated) (the case of an indirect network).

FIG. 19 is a flowchart for illustrating the job preferential assignment process in the case where the computation nodes 102 to 109 are connected indirectly via a switch (not illustrated) (the case of an indirect network).

In the case where the user submits a job (S90), the processor 101a of the control node 101 assigns 0 to the variable n (S91).

Next, the processor 101a of the control node 101 retrieves the available node in the non-power saving mode (S92).

Next, the processor 101a of the control node 101 determines whether or not the available node in the non-power saving mode is retrieved (S93).

As a result, in the case where the available node is not retrieved (S93: NO), the processor 101a of the control node 101 selects the available node in the power saving mode (S94), and adds the selected available node to a list (S95).

On the other hand, as the result of the determination in S93, in the case where the available node in the non-power saving mode is retrieved (S93: YES), the processor 101a of the control node 101 adds the retrieved available node in the non-power saving mode to the list (S96).

Next, the processor 101a of the control node 101 increments the variable n by 1 (S97).

Next, the processor 101a of the control node 101 determines whether or not the variable n matches the number of nodes requested by the job (S98).

As a result, in the case where the variable n matches the number of nodes requested by the job (S98: YES), the processor 101a of the control node 101 assigns the job to the node recorded in the list (S99).

On the other hand, in the case where the variable n does not match the number of nodes requested by the job (S98: NO), the processor 101a of the control node 101 repeatedly executes S92 to S98 until the variable n matches the number of nodes requested by the job (S98: YES).

According to the present process, it is possible to assign the job submitted in S90 preferentially to the available node in the non-power saving mode retrieved in S93.

Figure 20:
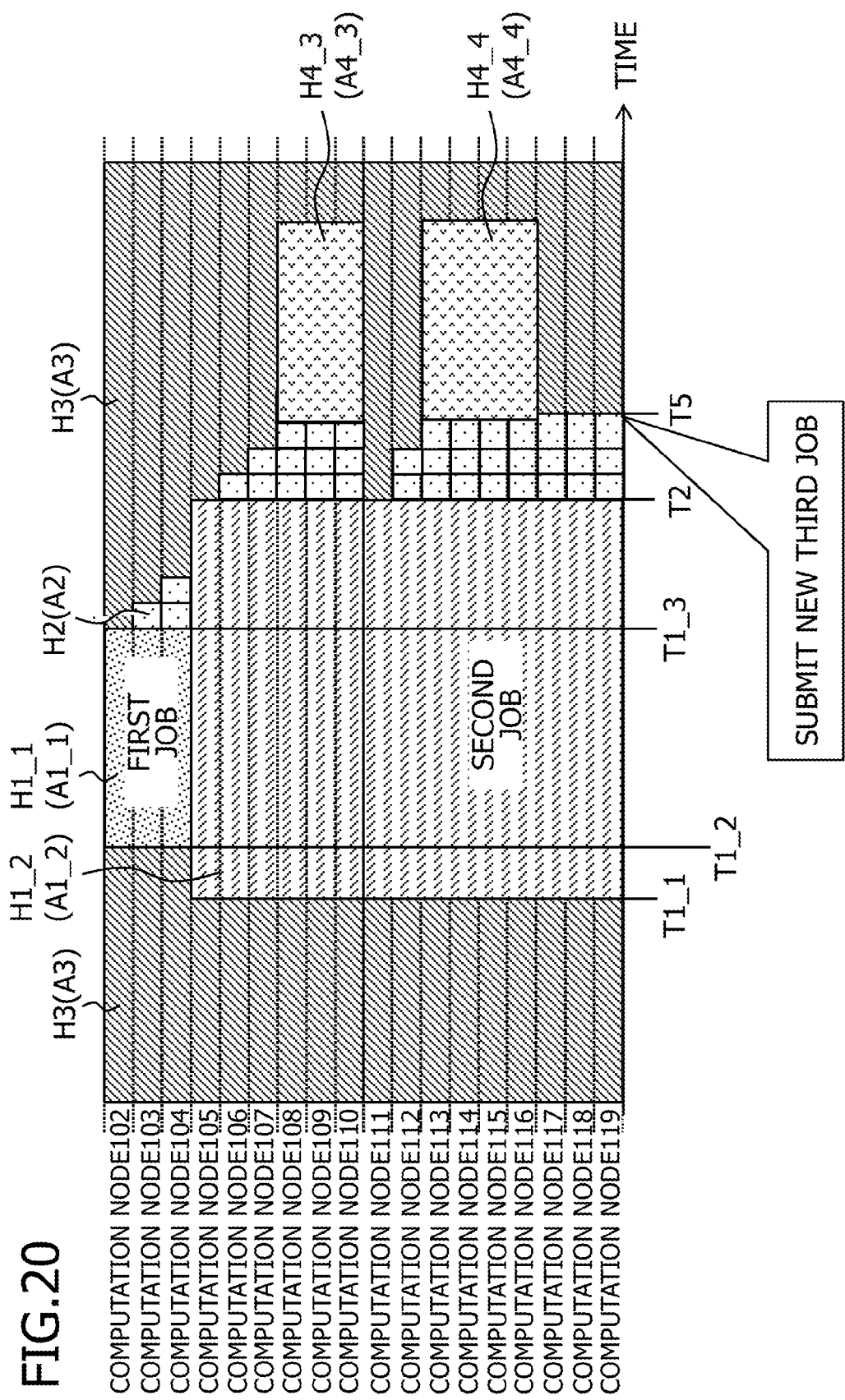
FIG. 20 is a view for illustrating the computation node to which the new third job is assigned in the case where the new third job is submitted at time T5.

For example, as illustrated in FIG. 20, in the case where the new third job is submitted at time T5, the processor 101a of the control node 101 can assign the third job preferentially to the computation nodes 108 to 110 and 113 to 116 in the non-power saving mode (job non-execution). FIG. 20 is a view for illustrating the computation node to which the new third job is assigned in the case where the new third job is submitted at time T5.

As described above, according to the process in FIG. 19, in the case where the new third job is submitted at time T5 (see FIG. 20) after the end of the second job, it is possible to assign the new third job to more computation nodes in the non-power saving mode (job non-execution). Consequently, it is possible to reduce the frequency of excessive increase of the temperature of the computation node.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a plurality of computation nodes each having a CPU that executes an assigned job;
a cooler that cools a refrigerant in a conduit in which the refrigerant that cools the CPU of each of the plurality of computation nodes circulates; and
a control node to which the plurality of computation nodes and the cooler are connected, wherein the control node:
assigns a job to the plurality of computation nodes;
decreases a cooling power of the cooler by a predetermined extent after execution of the job by the plurality of computation nodes to which the job is assigned is ended; and
causes the CPU of each of the plurality of computation nodes in which the execution of the job is ended to transition from a non-power saving mode to a power saving mode a predetermined number of the CPUs at a time at a predetermined time interval when a temperature of the refrigerant is equal to or more than a threshold value, and stops a process of causing the CPU to transition to the power saving mode while the temperature of the refrigerant is less than the threshold value.

2. The information processing apparatus according to claim 1, wherein
the control node decreases the cooling power of the cooler by the predetermined extent in a case where the temperature of the refrigerant is less than the threshold value after the execution of the job is ended.

3. The information processing apparatus according to claim 1, further comprising a plurality of the coolers, wherein
the control node executes a process of assigning the job, a process of decreasing the cooling power of the cooler by the predetermined extent, and a process of stopping the process of causing the CPU to transition to the power saving mode for each of the plurality of the coolers.

4. The information processing apparatus according to claim 1, wherein
in a case where a new job is submitted after the execution of the job by the plurality of computation nodes to which the job is assigned is ended, the control node assigns the new job preferentially to the computation node in the non-power saving mode.

5. The information processing apparatus according to claim 1, wherein
the plurality of computation nodes are directly connected.

6. The information processing apparatus according to claim 1, wherein
the plurality of computation nodes are indirectly connected.

7. A non-transitory computer-readable storage medium storing therein a power saving transition program for causing an information processing apparatus, which includes a plurality of computation nodes each having a CPU that executes an assigned job, a cooler that cools a refrigerant in a conduit in which the refrigerant that cools the CPU of each of the plurality of computation nodes circulates, and a control node to which the plurality of computation nodes and the cooler are connected, to execute a process comprising:
assigning a job to the plurality of computation nodes;
decreasing a cooling power of the cooler by a predetermined extent after execution of the job by the plurality of computation nodes to which the job is assigned is ended; and causing the CPU of each of the plurality of computation nodes in which the execution of the job is ended to transition from a non-power saving mode to a power saving mode sequentially at a predetermined time interval when a temperature of the refrigerant is equal to or more than a threshold value, and stopping a process of causing the CPU to transition to the power saving mode while the temperature of the refrigerant is less than the threshold value.

8. A power saving transition method comprising:

causing an information processing apparatus, which includes a plurality of computation nodes each having a CPU that executes an assigned job, a cooler that cools a refrigerant in a conduit in which the refrigerant that cools the CPU of each of the plurality of computation nodes circulates, and a control node to which the plurality of computation nodes and the cooler are connected, to execute a process comprising:

assigning a job to the plurality of computation nodes;

decreasing a cooling power of the cooler by a predetermined extent after execution of the job by the plurality of computation nodes to which the job is assigned is ended; and causing the CPU of each of the plurality of computation nodes in which the execution of the job is ended to transition from a non-power saving mode to a power saving mode sequentially at a predetermined time interval when a temperature of the refrigerant is equal to or more than a threshold value, and stopping a process of causing the CPU to transition to the power saving mode while the temperature of the refrigerant is less than the threshold value.

* * * * *